US012551164B2

(12) United States Patent
Swertfager et al.

(10) Patent No.: US 12,551,164 B2
(45) Date of Patent: Feb. 17, 2026

(54) DIAGNOSTIC TOOL AND THERAPEUTIC METHODS FOR SLEEP RESPIRATORY ISSUES VIA A POSITIONAL THERAPY EAR DEVICE USING AUDIBLE NOTIFICATION

(71) Applicant: SleepDev LLC, Aptos, CA (US)

(72) Inventors: Michael McNeil Swertfager, Aptos, CA (US); James Barry Gartrell, Santa Monica, CA (US)

(73) Assignee: SLEEPDEV, INC., Aptos, CA (US)

( * ) Notice: Subject to any disclaimer, the term of this patent is extended or adjusted under 35 U.S.C. 154(b) by 391 days.

(21) Appl. No.: 18/321,572

(22) Filed: May 22, 2023

(65) Prior Publication Data

US 2023/0284973 A1    Sep. 14, 2023

Related U.S. Application Data

(60) Provisional application No. 63/345,334, filed on May 24, 2022.

(51) Int. Cl.
*A61B 5/00* (2006.01)
*A61B 5/0205* (2006.01)
(Continued)

(52) U.S. Cl.
CPC .......... *A61B 5/4818* (2013.01); *A61B 5/0002* (2013.01); *A61B 5/0205* (2013.01);
(Continued)

(58) Field of Classification Search
CPC ... A61B 5/4818; A61B 5/0002; A61B 5/0205; A61B 5/11; A61B 5/6817; A61B 5/7405;
(Continued)

(56) References Cited

U.S. PATENT DOCUMENTS

| 4,220,142 A | 9/1980 | Rosen |
| 4,715,367 A | 12/1987 | Crossley |

(Continued)

FOREIGN PATENT DOCUMENTS

| AU | 768822 | 4/2001 |
| CN | 101053538 | 10/2007 |

(Continued)

OTHER PUBLICATIONS

PCT Search Report and Written Opinion for PCT/US23/23133, mailing date of Oct. 10, 2023, 11 pages.

(Continued)

*Primary Examiner* — Amanda L Steinberg
(74) *Attorney, Agent, or Firm* — Jaffery Watson Hamilton & DeSanctis LLP

(57) ABSTRACT

Systems, devices, and methods for facilitating diagnosis of sleep respiratory issues and/or delivering therapy for sleep respiratory issues are provided. According to one embodiment, an electronic ear device may be used to provide an effective and more sleep conducive method for positional sleep therapy. For example, positional therapy may be implemented through audible notifications delivered through the ear device to reduce symptoms of positional sleep respiratory issues. A positional sensor within the ear device allows the ear device to recognize when a user of the ear device is out of their programmed sleep position. The sleeper can then be notified through a speaker in the ear device to adjust themselves to a more optimal sleep position for reduced snoring and/or sleep obstruction. The ear device may alternatively or additionally capture user sleep data to facilitate diagnosis of a sleep respiratory issue by a medical professional.

43 Claims, 25 Drawing Sheets

(51) Int. Cl.
    *A61B 5/024*    (2006.01)
    *A61B 5/08*    (2006.01)
    *A61B 5/11*    (2006.01)
    *A61B 7/00*    (2006.01)

(52) U.S. Cl.
    CPC .............. *A61B 5/11* (2013.01); *A61B 5/6817* (2013.01); *A61B 5/7405* (2013.01); *A61B 5/746* (2013.01); *A61B 7/003* (2013.01); *A61B 5/02438* (2013.01); *A61B 5/0816* (2013.01); *A61B 2562/0204* (2013.01); *A61B 2562/0219* (2013.01)

(58) Field of Classification Search
    CPC ... A61B 5/746; A61B 5/02438; A61B 5/0816; A61B 7/003; A61B 2562/0204; A61B 2562/0219
    See application file for complete search history.

(56) References Cited

U.S. PATENT DOCUMENTS

| | | | |
|---|---|---|---|
| 4,788,533 | A | 11/1988 | Mequignon |
| 4,802,485 | A | 2/1989 | Bowers |
| 4,830,008 | A | 5/1989 | Meer |
| 4,848,360 | A | 7/1989 | Palsgard |
| 5,081,447 | A | 1/1992 | Echols |
| 5,265,624 | A | 11/1993 | Bowman |
| 5,381,801 | A | 1/1995 | McShane |
| 5,447,161 | A | 9/1995 | Blazek |
| 5,555,891 | A | 9/1996 | Eisenfeld |
| 6,057,767 | A | 5/2000 | Barnoach |
| 6,306,088 | B1 | 10/2001 | Krausman et al. |
| 6,544,199 | B1 | 4/2003 | Morris |
| 6,600,949 | B1 | 7/2003 | Turcott |
| 6,641,571 | B2 | 11/2003 | Redmond |
| 6,935,335 | B1 | 8/2005 | Lehrman |
| 6,970,792 | B1 | 11/2005 | Diab |
| 7,081,095 | B2 | 7/2006 | Lynn |
| 7,117,028 | B2 | 10/2006 | Bardy |
| 7,118,534 | B2 | 10/2006 | Ward |
| 7,311,666 | B2 | 12/2007 | Stupp |
| 7,331,349 | B2 | 2/2008 | Brady |
| 7,575,005 | B2 | 8/2009 | Mumford et al. |
| 7,599,892 | B1 | 10/2009 | Berger |
| 7,691,067 | B2 | 4/2010 | Westbrook |
| 7,717,848 | B2 | 5/2010 | Heruth |
| 7,956,756 | B2 | 6/2011 | Kubey |
| 8,213,670 | B2 | 7/2012 | Lai |
| 8,493,220 | B2 | 7/2013 | Virtanen |
| 8,784,293 | B2 | 7/2014 | Popovic |
| 8,803,682 | B2 | 8/2014 | Wong |
| 9,734,815 | B2 | 8/2017 | DeFranks, II |
| 9,906,636 | B2 | 2/2018 | Lee |
| 10,470,719 | B2 | 11/2019 | Shimol |
| 10,638,973 | B2 | 5/2020 | Levendowski |
| 10,653,366 | B2 | 5/2020 | Levine |
| 11,503,396 | B2 | 11/2022 | Sandanger |
| 2002/0184050 | A1 | 12/2002 | Papageorge |
| 2002/0188205 | A1 | 12/2002 | Mills |
| 2003/0199945 | A1 | 10/2003 | Ciulla |
| 2004/0015337 | A1 | 1/2004 | Richard |
| 2005/0197588 | A1 | 9/2005 | Freeberg |
| 2005/0234313 | A1 | 10/2005 | Rowlandson |
| 2006/0064037 | A1* | 3/2006 | Shalon ................ G16H 20/60 128/903 |
| 2006/0074334 | A1 | 4/2006 | Coyle |
| 2006/0100538 | A1 | 5/2006 | Genger |
| 2007/0084470 | A1 | 4/2007 | Sarazen |
| 2007/0208269 | A1 | 9/2007 | Mumford |
| 2007/0214013 | A1 | 9/2007 | Silverman |
| 2007/0239225 | A1 | 10/2007 | Saringer |
| 2007/0282177 | A1 | 12/2007 | Pilz |
| 2008/0023011 | A1 | 1/2008 | Zohlmann |
| 2008/0127978 | A1 | 6/2008 | Rubin et al. |
| 2008/0234598 | A1 | 9/2008 | Snyder |
| 2008/0264426 | A1 | 10/2008 | Walker |
| 2009/0120446 | A1 | 5/2009 | Vaska |
| 2009/0198145 | A1 | 8/2009 | Chow |
| 2009/0250070 | A1 | 10/2009 | Pfeifer |
| 2011/0295083 | A1 | 12/2011 | Doelling et al. |
| 2012/0097156 | A1 | 4/2012 | Bowman et al. |
| 2012/0229634 | A1 | 9/2012 | Laett |
| 2015/0173672 | A1* | 6/2015 | Goldstein ............ A61B 5/6898 600/301 |
| 2018/0131847 | A1* | 5/2018 | Kokonaski ............ H02J 50/10 |
| 2019/0008450 | A1* | 1/2019 | Gurievsky ........... A61B 5/4812 |
| 2019/0076601 | A1* | 3/2019 | Newberry ........... A61M 5/1723 |
| 2019/0224050 | A1 | 7/2019 | Kurzweil |
| 2019/0362557 | A1* | 11/2019 | Lacey ....................... G06T 5/20 |
| 2019/0388024 | A1 | 12/2019 | Goldstein |
| 2020/0051415 | A1 | 2/2020 | Grubbs et al. |
| 2020/0297955 | A1* | 9/2020 | Shouldice ............ A61M 16/06 |
| 2021/0007669 | A1 | 1/2021 | Jin |
| 2021/0169417 | A1 | 6/2021 | Burton |
| 2022/0203063 | A1 | 6/2022 | Kahlert et al. |
| 2024/0089688 | A1* | 3/2024 | Leppänen ............... G06F 3/012 |

FOREIGN PATENT DOCUMENTS

| | | |
|---|---|---|
| EP | 1578251 | 7/2004 |
| JP | 0349748 A | 3/1991 |
| JP | 07213546 A | 8/1995 |
| JP | 2005185650 A | 7/2005 |
| JP | 2005270627 | 10/2005 |
| JP | 2005312901 | 11/2005 |
| JP | 2005318907 | 11/2005 |
| JP | 2007294143 A | 11/2007 |
| JP | 2008011865 | 1/2008 |
| JP | 2007199025 A | 12/2012 |
| JP | 6697035 B2 | 5/2020 |
| JP | 6993320 B2 | 2/2022 |
| KR | 20210042227 A | 4/2021 |
| WO | 2002065901 | 8/2002 |
| WO | 2006133548 | 12/2006 |
| WO | 2007072390 | 6/2007 |
| WO | 2007100959 | 9/2007 |
| WO | 2008008915 | 1/2008 |
| WO | 2011139141 | 11/2011 |
| WO | 2016153359 A2 | 9/2016 |
| WO | 2023230012 | 11/2023 |

OTHER PUBLICATIONS

PCT International Search Report and Written Opinion for International Application No. PCT/US2024/038608, mailing date Dec. 10, 2024, 30 pages, USPTO.

Summer, Jay, "At-Home Sleep Tests and Studies", May 8, 2023, https://www.sleepfoundation.org/sleep-studies/at-home-sleep-study, downloaded May 18, 2023, 10 pages.

Goyal, Munish, et al., "Obstructive Sleep Apnea Diagnosis and Management", Science of Medicine, Mar./Apr. 2017, pp. 120-124.

"What to Know About an At-Home Sleep Test", https://www.hopkinsmedicine.org/health/wellness-and-prevention/what-to-know-about-an-at-home-test, downloaded May 18, 2023, 4 pages.

* cited by examiner

900

910  920  930

| Name | Related Config | Description |
|---|---|---|
| LED brightness | standbyLedLevel | The user can set the brightness of the LED on the device. |
| Alert Hold Off | alertHoldoffCount | After rolling into the alert zone, how many seconds does the user want to wait until the alert set start |
| Squelch | alertSquelchLevel | After how many alerts in an alert set does the user want to hear before it stops and waits for the next time the user is alerted? Can range from 1 to infinity. |
| Alert Ramp | alertMode<br>alertStartValue<br>alertScaleFactor<br>alertGrowthFactor | Each alert in an alert set can ramp in volume. Does the user want the volume to increase between alerts exponentially or arithmetically? Or, stay constant? |
| Start Volume | alertStartValue | What is the volume of the 1st alert in an alert set? |
| End Volume | alertMode<br>alertStartValue | What is the volume of the last alert in an alert set? |
| Alert Angle | alertAngle | From the set alert point, how many degrees from that point does the user want to set the alert zone. |
| Snooze | alertSnoozeTime | When the user taps the device, how long does they want the device to not notify them if they roll into the alert zone. |
| Alert Delays | alertDelayTime | In an alert sec, how many seconds does the user want between alert sounds. |
| Tone Duration | alertDurationTime | A user can use a sampled sound or a tone. If the user is using a tone for alerts, they can set how long each tone alert lasts. |
| Tone or Sample | alertPattern | A user can use a sampled sound or a tone. This allows them to choose which. |

FIG. 9

| | Data Type | Name | Description |
|---|---|---|---|
| 1500 / 1510 / 1520 / 1530 | | | |
| 1501 | time_t | timestamp | 32-bit seconds since the epoch 1970-01-01 |
| 1502 | uint32_t | stateTime | milliseconds that we have been in the current state |
| 1503 | uint8_t | state | current state from state machine |
| | uint8_t | hwFlags | (Accel Int 1, Accel Int 2, MIC Int, Chg-En Int, D4, D19 ) |
| | uint8_t | swFlags | (Valid Accel, Accel SoftInt 1, Accel Soft Int2, MIC SoftInt, Snoring Int, Flat Int, REM Int ) |
| 1504 | uint8_t | alertLevel | Current Alert Level |
| 1505 | uint16_t | alertCount | Total Alerts for this sleep session |
| 1506 | uint16_t | motionCount | Total Accel motion interrupts for this sleep session |
| 1507 | uint16_t | micCount | Total Mic auditory interrupts for this sleep session |
| | uint16_t | vDDH | converted to mV |
| | uint16_t | vBat | converted to mV |
| | uint16_t | vSys | converted to mV |
| | uint16_t | vIn | converted to mV |
| | uint16_t | iChg | permyriad of programmed max charge (2.5mA), 50.25% = 5025 |
| | int16_t | tempCore | converted to signed 16-bit degC * 100 |
| | int16_t | tempAlt | converted to signed 16-bit degC * 100 |
| 1511 | int16_t | X | captured as 14-bit 2's complement, current absolute pointing angle |
| 1512 | int16_t | Y | captured as 14-bit 2's complement, current absolute pointing angle |
| 1513 | int16_t | Z | captured as 14-bit 2's complement, current absolute pointing angle |
| 1514 | int16_t | tareX | captured as 14-bit 2's complement, set during calibration, specifies alert angle |
| 1515 | int16_t | tareY | captured as 14-bit 2's complement, set during calibration, specifies alert angle |
| 1516 | int16_t | tareZ | captured as 14-bit 2's complement, set during calibration, specifies alert angle |
| 1521 | uint8_t | heartRate | Beats per minute extrapolated from IMU or microphone |
| 1522 | uint8_t | breathRate | Breaths per minute extrapolated from IMU or microphone |
| | uint8_t | chargeStat | Current charge status (bit6 = Constant Voltage, bit5 = Charge Done, bit1 = Power Good) |
| 1523 | uint8_t | oxygenSat | Current oxygen saturation reading, stored as percent 0-100 |
| 1524 | float | zAngle | computed from (current X,Y,Z + calibrated Tare) |
| 1525 | float | zPitch | computed from (current X,Y,Z + calibrated Tare) |
| 1526 | float | zRoll | computed from (current X,Y,Z + calibrated Tare) |

*FIG. 15*

| Data Type | Name | Default Value | Details |
|---|---|---|---|
| uint8_t | versionID | | 0-0-254, 255 is off limits, increments when config structure changes |
| uint8_t | disableTSD | 0 | Do not write Time-Series data to file, 1 = TSD writes disabled |
| uint8_t | standbyLedLevel | 1 | Ranges from 0-255, 0 = 100% off and 255 = 100% on |
| uint8_t | alertHoldoffCount | 1 | Ranges from 0-6, Number of levels to skip before alerting the first time |
| uint8_t | alertSquelchLevel | 0 | Ranges from 0-255, 0 = No Squelch, N = Alert level to begin SQUELCH |
| uint8_t | alertMode | 2 | The formula used to determine alert strength, 0 = No Alert, 1 = Arithmetic Progression (m*x+b), 2 = Geometric Progression (m*r^x+b) |
| uint8_t | alertStartValue | 0 | Ranges from 0-100, b in "mx + b" or "m*r^x + b" |
| int8_t | timezoneOffset | -28 | 15 minute increments from utc |
| int16_t | accelTareX | 0x0000 | Alert angle vector captured as 14-bit 2's complement, set during calibration |
| int16_t | accelTareY | 0x0000 | Alert angle vector captured as 14-bit 2's complement, set during calibration |
| int16_t | accelTareZ | 0x4000 | Alert angle vector captured as 14-bit 2's complement, set during calibration |
| float | alertScaleFactor | 1 | Any float from 0.0 - 100.0, m in "mx + b" or "m*r^x + b" |
| float | alertGrowthFactor | 2 | Any float from 0.0 - 100.0, r in "m*r^x + b", mode 2 only |
| float | alertAngle | 44.8 | The width of the alert zone, any float from 0.0 - 44.8 degrees, negative indicates inverse alertNotification angle (alert if outside the alert zone) |
| uint32_t | alertSnoozeTime | 180000 | The amount of time the device will pause notifications after snooze Taps, ranges from 1000 - 4294967295 ms, 180000 = 3min |
| uint32_t | alertDelayTime | 8000 | The amount of time between alerts, ranges from 1000 - 4294967295 ms, 8000 = 8s |
| uint32_t | standbyDelayTime | 5000 | The about of time to wait during each cycle of the state machine task loop, ranges from 1000 - 4294967295 ms, 5000 = 5s |
| uint32_t | alertDurationTime | 2000 | The length of time to play an audible alert tone, any value from 25ms to 5000ms, 2000 = 2.0s (valid for tone only) |
| uint32_t | alertPattern | 0xFFFFFFFF | The pattern of audible notification to play, any pattern of 32 bits, 0xFFFFFFFF = solid tone, 0x0 = play digital sampled sound file |

FIG. 16

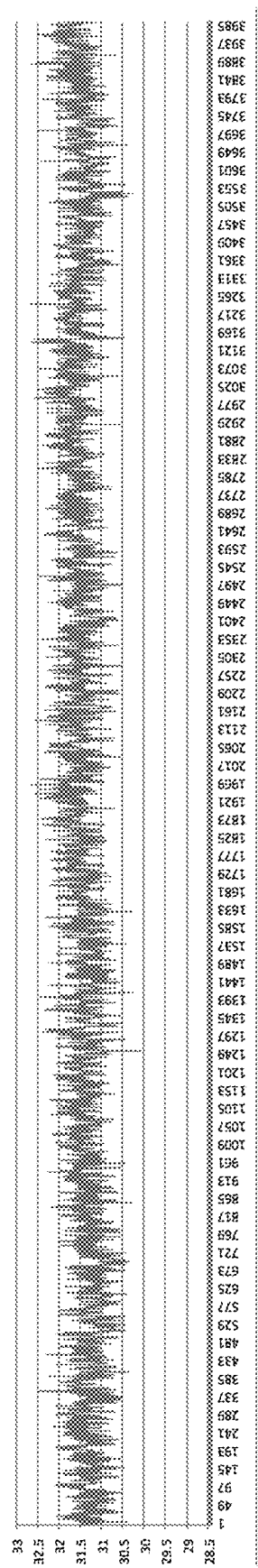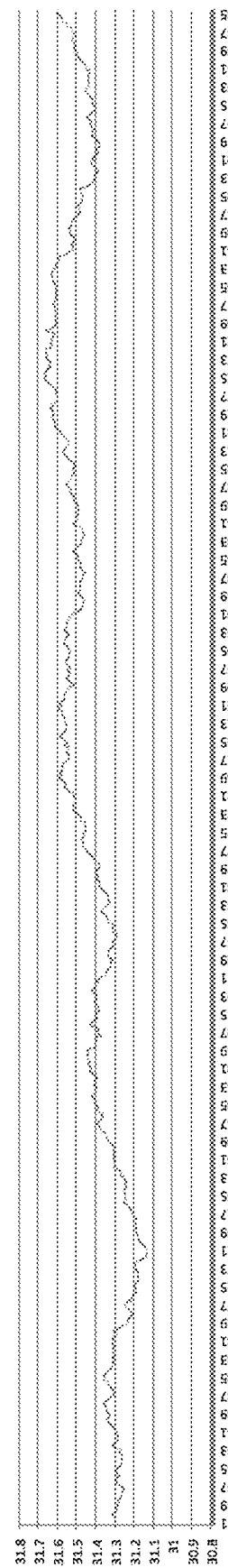
FIG. 17

| Condition | Definition | Data captured for device reporting and doctor diagnosis |
|---|---|---|
| Snoring | the hoarse vibratory sound that occurs when air flows past relaxed tissues in your throat, causing the tissues to vibrate as you breathe during sleep. | - sound<br>- head vibration |
| Positional Snoring | snoring that increases or decreases in severity or frequency based on sleeping position | - sound<br>- head vibration<br>- sleeping position |
| Upper Airway Resistance Syndrome (UARS) | form of sleep-disordered breathing in which repetitive increases in resistance to airflow within the upper airway lead to brief arousals and daytime somnolence. | - respiratory rate<br>- blood oxygen saturation<br>- heart rate |
| Positional UARS | UARS that increases or decreases in severity or frequency based on sleeping position | - respiratory rate<br>- blood oxygen saturation<br>- heart rate<br>- sleeping position |
| Sleep Apnea (SA) | condition in which your breathing stops and restarts many times while you sleep | - respiratory rate<br>- blood oxygen saturation<br>- heart rate |
| Positional SA | sleep apnea that increases or decreases in severity or frequency based on sleeping position | - respiratory rate<br>- blood oxygen saturation<br>- heart rate<br>- sleeping position |

*FIG. 23*

DIAGNOSTIC TOOL AND THERAPEUTIC METHODS FOR SLEEP RESPIRATORY ISSUES VIA A POSITIONAL THERAPY EAR DEVICE USING AUDIBLE NOTIFICATION

CROSS-REFERENCE TO RELATED APPLICATIONS

This application claims the benefit of priority of U.S. Provisional Application No. 63/345,334, filed May 24, 2022, the contents of which are hereby incorporated by reference in their entirety for all purposes.

BACKGROUND

Field

Various embodiments of the present disclosure generally relate to facilitating diagnosis and/or treatment of sleep respiratory issues. In particular some embodiments relate to the use of an ear device for monitoring, among other things, breathing sounds, occurrences of breathing cessation, oxygen saturation, and/or a user's sleep position to detect potential existence of sleep respiratory issues (e.g., snoring, positional snoring, upper airway resistance syndrome (UARS), positional UARS, sleep apnea (SA), and/or positional SA (PSA)) and/or for determining when the user is sleeping in a position outside of a configured positional therapy range to train the user to sleep in a position that reduces their symptoms by providing audible notifications to prompt the sleeper to reposition themselves accordingly.

Description of the Related Art

Nearly half of the adult population snores, indicating a reduction of airflow and increased noise for both the person sleeping and their partner, affecting their quality of their sleep. Many of these snorers suffer from the more serious condition: obstructive sleep apnea, which is associated with daytime fatigue, high blood pressure, heart problems, type 2 diabetes, metabolic syndrome, liver problems, sleep deprivation, and possibly dementia. Positional therapy, where a person sleeps in a particular position (most frequently their side), is a commonly prescribed approach to reduce both snoring and obstructive sleep apnea. Positional therapy reduces the amount of time a person is sleeping in a position (usually on their back) where their nasopharynx, soft palate, and tongue collapse and interfere with airflow.

SUMMARY

Systems, devices, and methods are described for facilitating diagnosis of sleep respiratory issues and/or delivering therapy for sleep respiratory issues. According to one embodiment, a positional sleep therapy alert range is established with reference to a positional sensor of one or more sensors associated with an ear device worn by a user that is operable in one or more modes. During a sleep session and operation of the ear device in a first mode of the one or more modes, a determination is made regarding whether a sleep position of the user is within the positional sleep therapy alert range based on a state of the positional sensor. When the determination is affirmative, the user is prompted to alter their sleep position by providing an audible notification to the user via a speaker of the ear device that is proximate to or within an auditory canal of an ear of the user.

According to another embodiment, multiple observations are logged regarding existence or non-existence of an incident of breathing cessation and one or more of an orientation of a head of a user of an ear device in three-dimensional (3D) space, a breathing rate of the user, a heart rate of the user, a snoring state of the user, and an oxygen saturation of blood of the user by performing repeated measurements over time of multiple sensors associated with the ear device worn by the user during a sleep session. The user is then identified as potentially having a sleep respiratory issue by evaluating the multiple observations based on a set of criteria associated with the sleep respiratory issue.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 9 is a table illustrating user-configured sleep profile attributes in accordance with an embodiment of the present disclosure.

FIG. 15 is a table illustrating various types of data that may be stored in an in-memory time-series data structure in accordance with an embodiment of the present disclosure.

FIG. 16 is a table illustrating various types of data that may be stored in an in-memory configuration parameters data structure in accordance with an embodiment of the present disclosure.

FIG. 17 depicts breathing captured via a positional sensor in the form of a first graph illustrating a zAngle computed at 25 Hz over the course of 20 seconds and a second graph illustrating the results after passing the zAngle data through an exponential moving average (EMA) low-pass filter in accordance with an embodiment of the present disclosure.

FIG. 23 is a table illustrating various types of sleep respiratory issues, corresponding definitions, and data captured for ear device reporting and facilitation of diagnosis of a given sleep respiratory issue by a medical professional in accordance with an embodiment of the present disclosure.

DETAILED DESCRIPTION

Figure 1:
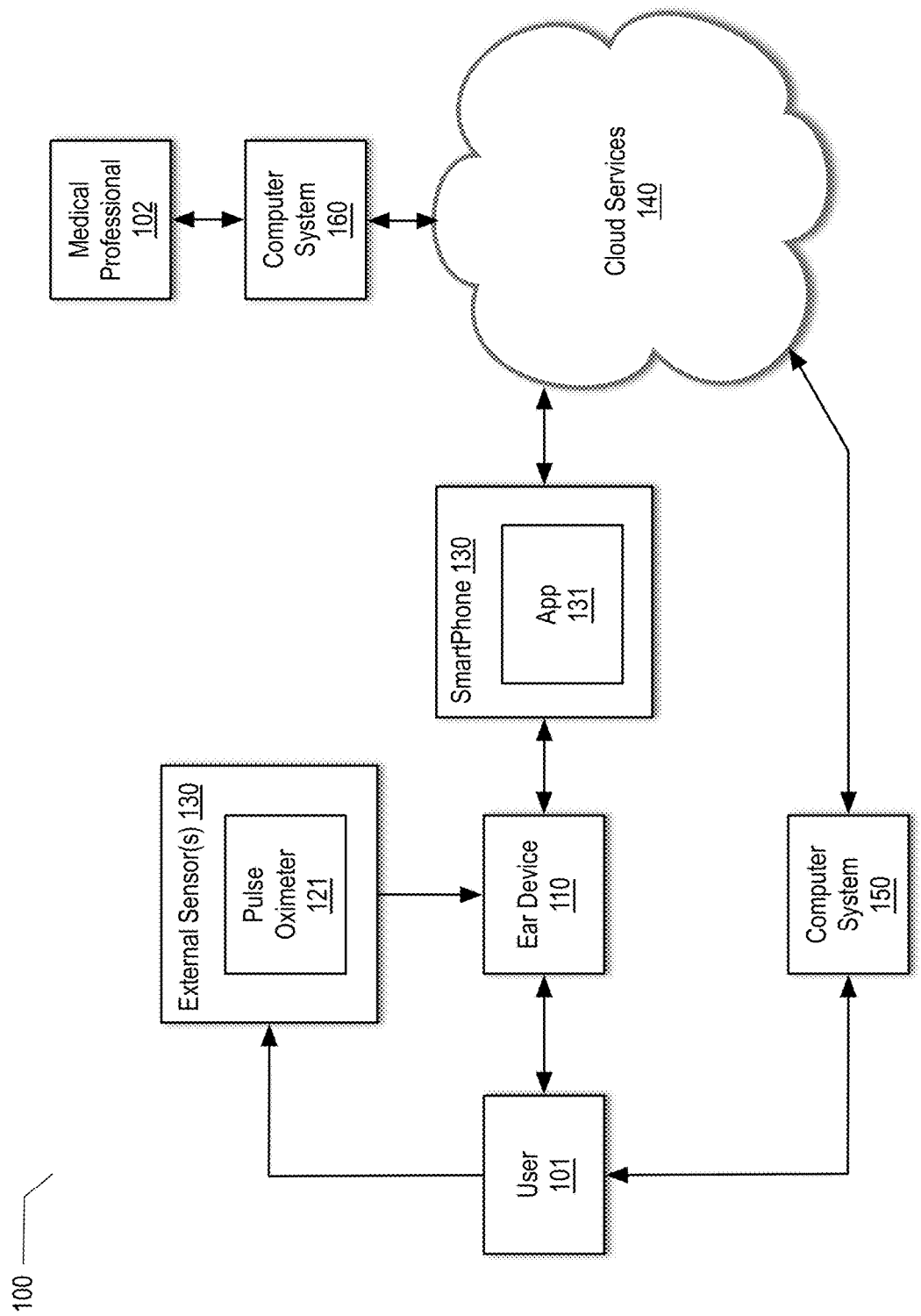
FIG. 1 is a context level diagram illustrating interactions with a system in accordance with an embodiment of the present disclosure.

Systems, devices, and methods are described for facilitating diagnosis of sleep respiratory issues and/or delivering therapy for sleep respiratory issues. Currently, people use backpacks, pillows, tennis balls down the back of the night shirt, and/or haptic notifiers to try to adhere to better sleep positions. Obstacle approaches to positional therapy such as a pillow, backpack, and a tennis ball influence the users to stay off the back through physical discomfort and obstruction of the prone sleeping position. These can cause ribs to be pushed out of alignment and exasperate back and neck skeletal conditions. The user will also experience discomfort when switching from one side to the other, even if they are not stopping to lie on their back, which causes additional unnecessary interruptions to sleep. While haptic notifiers for positional therapy may not cause physical discomfort for its users, the vibratory nature of haptic notification is often startling and extreme to someone in a restful sleep state. This can cause anticipation anxiety when wearing the device, wake the user up completely, and unsettle the user to the point where they cannot continue sleeping. As our alternative to both of the previous methods, audible notification is able to provide lighter less disturbing cues that can leverage the suggestive nature of those in lighter sleep stages, most positional shifting occurs on the lighter sleep stages (N1, N2). As a result, there is no discomfort, no risk to the skeletal structure, less probability of anxiety, and less extreme awakenings, resulting in more contiguous and restful sleep.

The ear device proposed herein seeks to address or at least mitigate various of the limitations of prior devices by providing an effective and more sleep conducive method for positional sleep therapy. In accordance with various embodiments described herein, positional therapy can be implemented through audible notifications delivered through an electronic ear device to reduce symptoms of positional sleep respiratory issues. For example, using a positional sensor (e.g., one or more of an accelerometer, a gyroscope, an inertial measurement unit (IMU), and a magnetometer or some combination thereof) along with a processor, the ear device can recognize when a user of the ear device is out of their programmed sleep position. The sleeper can then be notified through a speaker in the ear device to adjust themselves to a more optimal sleep position for reduced snoring and/or sleep obstruction. The audible notification can consist of various recorded (sampled) and/or synthesized sounds (e.g. voice instructions, animal and environmental sounds, beeps, and tones). Additionally, snoring detection may be leveraged through the positional sensor or a microphone to determine if repositioning is necessary. The ear device may capture user sleep data (including but not limited to sleep times, sleep positions, and sleep alerts), and ear device operational data. Using wireless networking, the ear device may send captured data to a computer or mobile device for review and further processing. The wireless communication may also be used to receive configurations, notification recordings, and sounds for use on the ear device. Over time, users are conditioned to avoid settling into the sleep positions that result in positional snoring, PSA, and/or positional UARS.

While various examples described herein involve alerting (e.g., providing an audible notification to) a user when a sleep position of the user (e.g., as indicated based on monitoring of a state of a positional sensor of an ear device worn by the user) is outside of a positional sleep therapy alert zone, it is to be appreciated such alerts may also be configured to provide notification when the user is inside of a positional sleep therapy alert zone, or alternatively (independently of the sleep position alerts) such alerts may be provided responsive to detecting the user is snoring or is experiencing a cessation of breathing.

While various examples described herein involve providing audible notifications (e.g., in the form of sampled sounds or tones), which are less jarring to a sleeper than haptic notifications, in some examples the ear device may augment audible notifications with haptic notifications, for example, for particularly deep sleepers.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, an "electronic ear device" or simply "ear device" generally refers to an ear bud-like device that can be worn by a user in their ear and includes at least a processor, a speaker, a positional sensor, and potentially one or more other integrated or external sensors. An ear device may be used as a sleep therapy tool to reduce snoring responsively by detecting snoring (through vibration picked up by the positional sensor or snoring sounds picked up by a microphone), prompting the user with an audible notification to adjust their sleeping position. The ear device may alternatively or additionally be used as a positional sleep therapy tool to reduce symptoms associated with positional sleep respiratory issues by detecting with the aid of the positional sensor when the user is sleeping in a designated unfavorable position and prompting the user with an audible notification to adjust their sleeping position. The ear device may alternatively or additionally be used as a home sleep test device to facilitate diagnosis of a sleep respiratory issue by capturing sleep data for analysis/evaluation by a medical professional.

As used herein, a "positional sensor" generally refers to a sensor that may be used to measure or otherwise determine an orientation of a device within which it is embedded in two-dimensional (2D) space (e.g., roll and pitch) or in three-dimensional (3D) space (e.g., roll, pitch, and yaw). Non-limiting examples of a positional sensor include an accelerometer, an inertial measurement unit (IMU), a gyroscope, a magnetometer, and/or any combination thereof.

As used herein, "sleep position" generally refers to the position of a user of an ear device during a sleep session. In various embodiments described herein, sleep position may refer to an orientation of the user's head in 2D or 3D space, for example, as determined with reference to a positional sensor of the ear device.

A "sleep session" generally refers to a time period during which an ear device is actively monitoring and/or logging one or more sleep attributes of a user of the ear device. In some examples described herein, a sleep session may be manually started by a user (e.g., via user input to an application associated with the ear device or via direct input to the ear device) or may be automatically started responsive to one or more predetermined trigger events (e.g., completion of calibration of a pointing angle of the ear device). A sleep session may also be ended manually by the user and/or automatically (e.g., responsive to the ear device being placed in a charging station or dock).

As used herein, a "sleep respiratory issue" generally refers to a condition in which a sleeper experiences snoring, sleep-disordered breathing, and/or incidents of breathing cessation. These symptoms may be accompanied by, among other things, one or more of headaches (especially when waking up), awakening with a dry mouth, feeling tired or exhausted when waking up, excessive daytime sleepiness, disruptions in brain function (e.g., memory loss, trouble concentrating or difficulty paying attention while awake, and/or other brain-related issues), mood changes (e.g., depression, anxiety, and/or irritability). Non-limiting examples of sleep respiratory issues include snoring, positional snoring, upper airway resistance syndrome (UARS), positional UARS, sleep apnea (SA), positional SA (PSA), obstructive sleep apnea (OSA), positional OSA (POSA), and central sleep apnea.

Example Therapeutic and/or Diagnostic System

FIG. 1 is a context level diagram illustrating interactions with a system 100 in accordance with an embodiment of the present disclosure. In this example, the system 100 includes an ear device 110, a mobile device (e.g., a smartphone 130), one or more optional external sensor(s) 120, and cloud services 140. The ear device 110 may be worn in the ear of a user 101 during a sleep session to monitor and receive, log, and/or process various inputs (e.g., blood oxygen saturation (SpO2), pulse data, body temperature, sound and vibration, sleep position, and/or user taps). Some subset of these inputs or other inputs may be received by internal sensors (not shown) integrated within the ear device or indirectly by the car device 110 through the one or more optional external sensor(s) 120 (e.g., an oximeter or a pulse oximeter). A non-limiting example of an architecture of an car device is described below with reference to FIG. 2. As described further below, the ear device 110 may be in the form of a low-profile ear bud that sits in the concha of the user's ear and includes a speaker (or receiver) located proximate to or within an auditory canal of the user's ear to facilitate prompting the user 101 with an audible notification when the user 101 is in a sleep position that is within a configured positional sleep therapy alert zone. In this manner, over time the user 101, who may have a positional sleep-related breathing disorder or positional sleep reparatory issue may be conditioned or otherwise trained to avoid settling into sleep positions (e.g., within the configured positional sleep therapy alert zone), thereby lessening their symptoms (e.g., occurrences of breathing cessation, gasping, snoring, or other airflow restrictions). As will be appreciated, the ear device 110 may also be used without conditioning, for example, as a home sleep test device that captures sleep data for analysis/evaluation by a medical professional 102. As described further below, in one embodiment, the user 101 may authorize access by a medical professional 102 (e.g., a sleep physician (or somnologist), a pulmonologist, or their medical staff) to user sleep reports stored in the user's cloud account, for example, via their own computer system 160.

The ear device 110 may also be useful for other types of users, with or without sleep respiratory issues. For example, a pregnant woman in her third trimester may desire to avoid sleeping on her back, a person with chiropractic issues may be advised to sleep in a specific position, a patient that uses a continuous positive airway pressure (CPAP) machine or a dental advancement device may want to ensure they sleep in a specific position, and a patient that experiences gastroesophageal reflux disease (GERD) or benign paroxysmal positional vertigo (BPPV) may want to avoid particular sleeping positions.

In one embodiment, the ear device 110 may be configured for multiple modes of operation, including a notification (therapeutic) mode and a logging (or diagnostic) mode. In the logging mode, audible notifications by the ear device 110 may be disabled to allow the user to acclimate to sleeping while wearing the ear device 110 and/or facilitate usage of the ear device 110 as a home sleep test. As described further below, in the logging mode, the ear device 110 may perform repeated measurements over time of multiple sensors associated with the ear device 110 and log observations regarding existence or non-existence of breathing cessation and one or more of a position of the user's head, a breathing rate of the user, a heart rate of the user, a snoring state of the user, a body temperature of the user, and an oxygen saturation of the blood of the user to allow the system 100 to be used to (i) facilitate diagnosis by a sleep or respiratory professional (e.g., a sleep physician (or somnologist) or a pulmonologist) of the user 101 as having a sleep respiratory issue based on the logged observations, (ii) identify the user as potentially having a sleep respiratory issue based on application of a set of predetermined or configurable criteria to the logged observations, and/or (iii) otherwise be used as part of a home sleep test.

According to one embodiment, the smartphone 130 includes a mobile app (e.g., app 131) associated with the ear device 110. The mobile app may facilitate, among other things, visualization of sleep session metrics, storage of time-series data collected by the ear device 110 locally and/or to the cloud services 140, and/or configuration of various ear device parameters (e.g., mode of operation (logging vs. notification), the size (e.g., width and/or depth) of the alert zone, the zero-point position or center of the alert zone, monitoring interval, etc.) and/or user preferences/profiles. A non-limiting example of an architecture of a mobile app is described below with reference to FIG. 3.

The cloud services 140 may be implemented within a public cloud service provider (e.g., Amazon Web Services (AWS), Google Cloud Platform (GCP), Microsoft Azure, or the like) provide, through interactions with the app 131 or a browser of a computer system 150, among other features, access to summaries, reports, and/or recommendations based on the logged data and the ability to integrate with medical systems, applications, and/or devices or otherwise export logged data in various data interchange formats (e.g., comma-separated values (CSV), JavaScript Object Notation (JSON), extensible markup language (XML), open source clinical application resource (OSCAR), and/or the like). Further description regarding examples of various features and functionality that may be provided by the cloud services 140 is provided below with reference to FIG. 4.

While in the context of the present example, a mobile device is described as running an app 131 associated with the ear device 110, it is to be appreciated various other mobile devices or portable computing devices may be used to interact with the car device 110, for example, including a tablet computer and a laptop computer.

Example Ear Device Architecture

Figure 2:
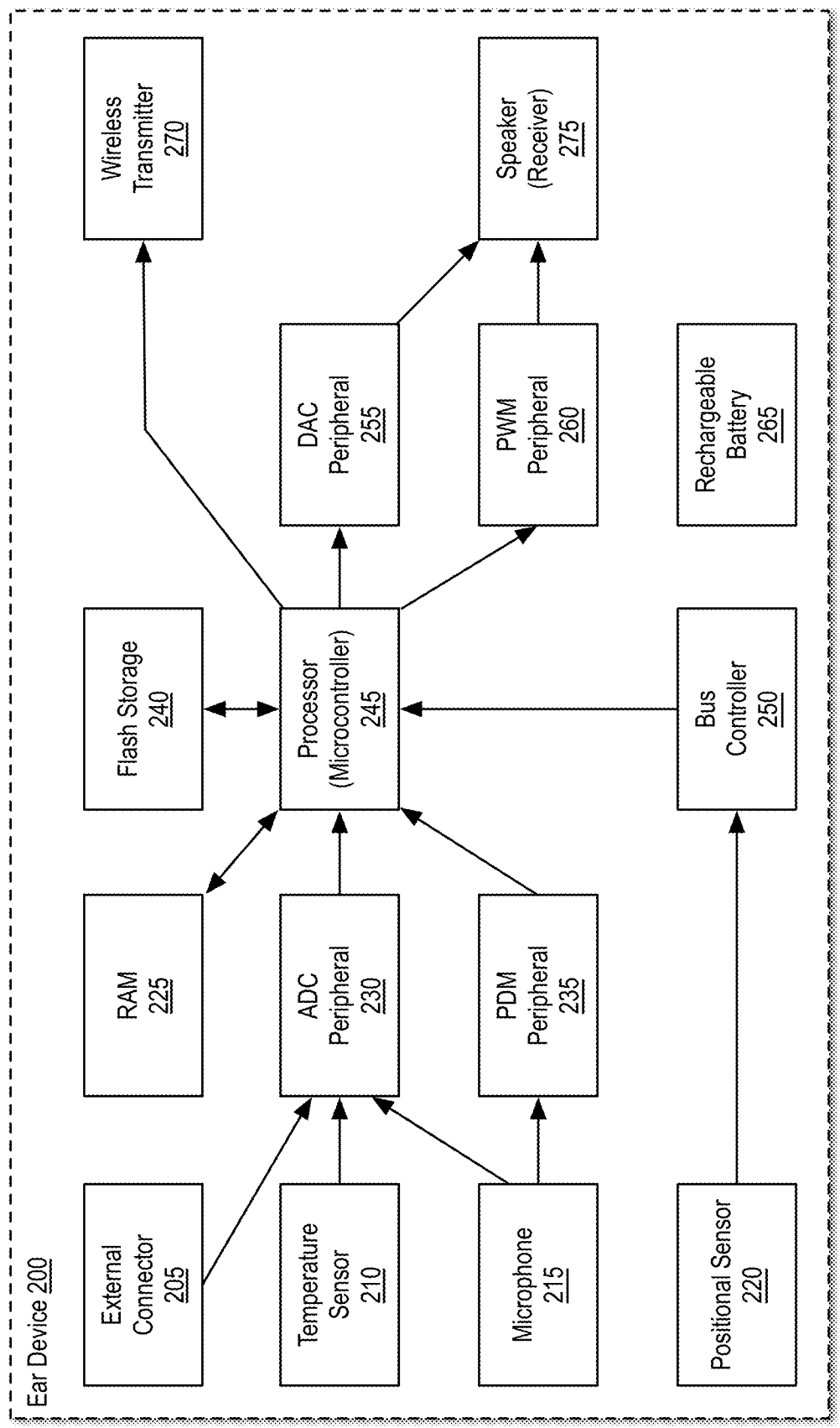
FIG. 2 is a block diagram illustrating an ear device in accordance with an embodiment of the present disclosure.

FIG. 2 is a block diagram illustrating an ear device 200 in accordance with an embodiment of the present disclosure. Notably, components of the ear device 200 (which may be analogous to ear device 110) are meant only to exemplify various possibilities. In no way should example ear device 200 limit the scope of the present disclosure. In the context of the present example, ear device 200 is shown including an external connector 205, a temperature sensor 210, a microphone 215, a positional sensor 220, a main memory (e.g., a random access memory (RAM) 225 or other dynamic storage device), an analog-to-digital converter (ADC) peripheral 230, a pulse density modulation (PDM) peripheral 235, flash storage 240, a processing resource (e.g., a processor or microcontroller 245, a central processing unit (CPU), or other hardware logic circuitry), a bus controller 250, a digital-to-analog converter (DAC) peripheral, a pulse width modulation (PWM) peripheral 260, a rechargeable battery 265, and a speaker (receiver) 275.

The components of the ear device 200 on the left-hand side may represent components for receiving inputs directly or indirectly from a human user of the ear device 200. For example, the external connector 205 may represent an electrical connector (e.g., in the form of external contact pads) to which one or more of the optional external sensors (e.g., external sensor(s) 120) may be coupled to the ear device 200. The temperature sensor 210 may measure the body temperature of the user (e.g., user 101) of the ear device 200. The microphone 215 may be used to receive environmental sounds or sounds (e.g., breathing sounds, heart sounds, gasping, snoring, etc.) made by the user.

The positional sensor 220 may be used to determine a sleep position of the user, for example, representing an orientation of the user's head in three-dimensional (3D) space. Interrupts (e.g., representing the detection of movement of the user, or input taps from the user) and other state information (e.g., X, Y, and Z angles/vectors) measured by the positional sensor may be communicated to the processor via a bus (e.g., an inter-integrated circuit (I2C) bus or a serial peripheral interface (SPI) bus) managed by the bus controller 250. As those skilled in the art will appreciate a number of different types of sensors may be used for this purpose including one or more of an accelerometer, an inertial measurement unit (IMU), a gyroscope, and a magnetometer or some combination of two or more of the foregoing. As described below with reference to FIGS. 10A-F, the orientation may be represented in the form of one or more of roll (rotation about a front-to-back axis, for example, the Y axis), pitch (rotation about a side-to-side axis, for example, the Z axis), and yaw (rotation about the vertical axis, for example, the X axis).

The main memory may be used for storing instructions (e.g., microcode) to be executed by the processor 245. Main memory may also be used for variables, stack data, cached registers, communication buffers, or temporarily storing information (e.g., time-series data and/or configuration parameters) while such information is incrementally persisted to flash storage 240. Non-limiting examples of the various types of data that may be stored in memory in a time-series data structure and an in-memory configuration parameters structure are described below with reference to FIGS. 16 and 17, respectively.

The ADC peripheral may be used to convert analog signals received through analog sensors (e.g., an external sensor coupled to the external connector 205, the temperature sensor 210, and/or an analog microphone) to a digital form so that it can be read and processed by the processor 245.

The PDM peripheral 235 may be used to convert amplitude values of an encoded analog signal to a digital bitstream (a stream of decimated samples) so that it can be read and processed by the processor.

Flash storage 240 (or some other form of nonvolatile memory) may be used to maintain the integrity of stored data (e.g., time-series data and/or configuration parameters), for example, until such data may be persisted to the cloud (e.g., cloud services 140) via a wireless connection with a portable computing device (e.g., smartphone 130) provided by the wireless transmitter 270. For example, in one embodiment, the wireless transmitter 270 may be deactivated while being worn by the user during a sleep session and then data stored or logged during the sleep session may be transferred to the cloud upon completion of the sleep session.

The processing resource (e.g., processor 245) is generally responsible for receiving data from various sources (e.g., the ADC peripheral 230, the PDM peripheral 235, and the bus controller 250), processing and/or organizing the data, making decisions based on the data, managing one or more state machines, and storing results of the processing and/or organization of the data to RAM 225 and/or flash storage 240 as appropriate. The processing resource may be represented in a number of different forms of electronic circuitry, for example, a microcontroller, a microprocessor, one or more CPU cores, an application-specific integrated circuit (ASIC), a field programmable gate array (FPGA), and the like. Non-limiting examples of processors/microcontrollers that are suitable for embedded systems requiring high performance and low power consumption include RISC-V-based processors/microcontrollers and ARM processors/microcontrollers A non-limiting example of the various tasks and communications between/among the tasks that may be executed by an operating system (e.g., a real-time operating system (RTOS)) running on the processing resource is described below with reference to FIG. 5. A non-limiting example of various ear device states is described below with reference to FIG. 7.

The DAC peripheral 255 may be used to convert digital signals received from the processor 245 to analog, for example, to provide audible notifications to the user. Alternatively, or additionally the PWM peripheral 260 may be driven by the processing resource to convert a digital bitstream to analog (e.g., amplitude values of an analog signal) to provide such audible notifications.

The wireless transmitter 270 may be used to exchange wireless communications between the ear device 200 and a portable computing device or a mobile device (e.g., smartphone 130). According to one embodiment, the wireless transmitter 270 represents a Bluetooth low energy (BLE) transmitter that may be used, for example, to send data captured/logged by the ear device 200 to the portable computing device or the mobile device for review and/or for further processing. According to one embodiment, file transfer from the ear device 200 to the portable computing device or the mobile device may be performed via BLE, universal asynchronous receiver/transmitter (UART) over BLE, or Zmodem over BLE. Wireless communication may also be used to receive configurations, notification recordings, and sounds for use by the ear device 200, for example, to alert the user when they are sleeping in an undesirable position (e.g., within the configured positional sleep therapy alert zone).

The speaker 275 may be used to provide an audible alert to the user, for example, indicating the user is in an undesirable sleep position or to otherwise prompt the user to alter their sleep position. In one embodiment, when the user is wearing the ear device 200, the speaker 275 is located proximate to (e.g., within about 0 to 5 millimeters) or within an auditory canal of the user's ear. In this manner, the audible notifications intended for the user will not be heard by a sleep partner of the user.

The ear device 200 is also shown including rechargeable battery 265. According to one embodiment, charging of the rechargeable battery 265 may be commenced responsive to detection of the ear device 200 having been placed within a dock (not shown). In alternative embodiment, the ear device 200 may make use of disposable (or single-use) batteries.

While in the context of the present example, various examples of internal sensors (e.g., temperature sensor 210, microphone 215, and positional sensor 220) are shown, it is to be appreciated some examples may include more or fewer internal sensors or one or more external sensors (e.g., external sensor(s) 120) may be used in place of one or more of the internal sensors or in addition to the internal sensors. For example, in one embodiment, the ear device may include or be configured to be coupled (e.g., via external connector 205) to an electrocardiogram (ECG or EKG). According to one embodiment, to facilitate reduction in size, cost, and/or power, usage of native functionality provided by the microcontroller may be favored over supplementing such native functionality. For example, if a given implementation makes use of a microcontroller having an integrated ADC peripheral, an analog microphone may be utilized, whereas if the microcontroller includes an integrated PDM peripheral, a PDM microphone may be utilized.

Example Mobile App Architecture

Figure 3:
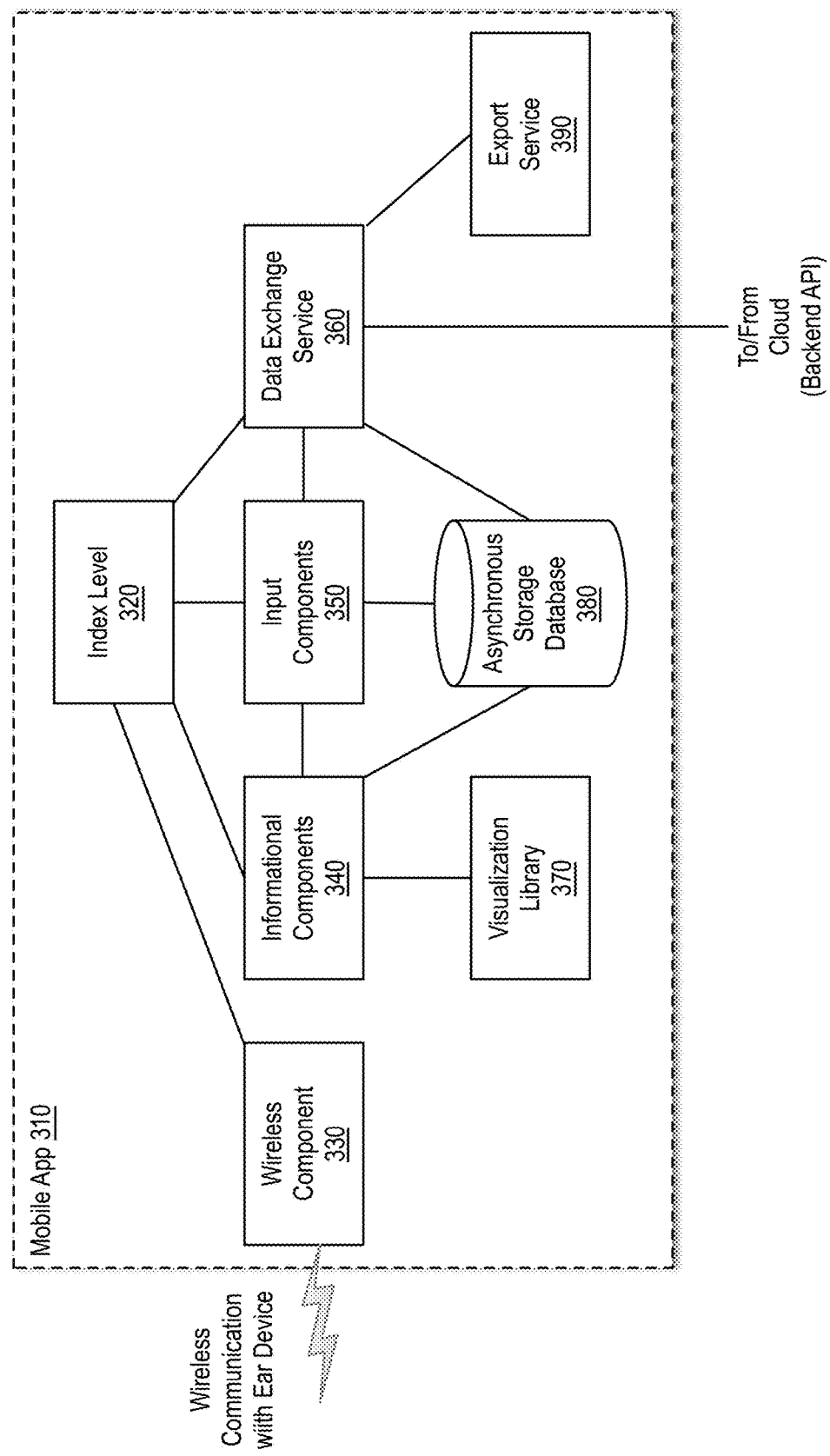
FIG. 3 is a block diagram illustrating an architecture of a mobile app in accordance with an embodiment of the present disclosure.

FIG. 3 is a block diagram illustrating an architecture 300 of a mobile app 310 in accordance with an embodiment of the present disclosure. The mobile app 310 (which may be analogous to app 131) may represent a mobile operating system app (e.g., an iPhone operating system (iOS) app, iPadOS app, or android app) available via an app store or an app marketplace (e.g., Google Play or the Apple App Store). In the context of the present example, the mobile app 310 is shown including an index level 320, a wireless component 330, informational components 340, input components 350, a data exchange service 360, a visualization library 370, an asynchronous storage database 380, and an export service 390.

The index level 320 may represent the home page or hub of the mobile app 310 that indexes into and connects to the other components.

The visualization library 370 may include user interface elements and/or modules for creating data visualizations, reports, aggregations and/or summaries of stored sleep sessions. The visualization library 370 may also facilitate providing the user (e.g., user 101) with real-time or near real-time visual feedback relating to information (e.g., breathing rate, heart rate, body temperature, oxygen saturation, etc.) received from an associated ear device (e.g., ear device 110 or 200), for example, via wireless component 330 (e.g., a Bluetooth component).

Informational components 340 may provide access to training materials and/or applications (including content developed by the vendor of the ear device and/or by third parties). Informational components 340 may also provide recommendations and/or feedback based on previous sleep sessions, for example, loaded from the cloud (e.g., cloud services 140) and locally stored within the asynchronous storage database 380.

Input components 350 may include forms for collecting data from the user, for example, relating to factors (e.g., caffeine and/or alcohol consumption, medications, sleep environment, exercise, stress level, food intake, water intake, and the like) that may impact sleep quality and how they feel after the most recent sleep session. For example, after each sleep session, the user may be prompted to fill out a form or respond to questions associated with a sleep questionnaire associated with the sleep session. The user may also be provided with the ability to update/revise responses for a previous sleep questionnaire associated with a prior sleep session.

The data exchange service 360 may be responsible for facilitating communication with backend services (e.g., cloud services 140) via an application programming interface (API) exposed by the backend services, including taking data structured in accordance with a first (source) schema used by the mobile app 310 and transforming it into a second (target) schema used by the backend services and vice versa to support storing/retrieving data to/from the cloud.

The export service 390 may be used to create exports for external medical applications (e.g., an electronic medical record (EMR) solution) in an appropriate format (e.g., CSV, OSCAR, or the like). Such data exports of time-series data associated with one or more user sleep sessions may also facilitate evaluation of a user's symptoms or diagnosis of a sleep respiratory issue by a medical professional.

Example Cloud Services

Figure 4:
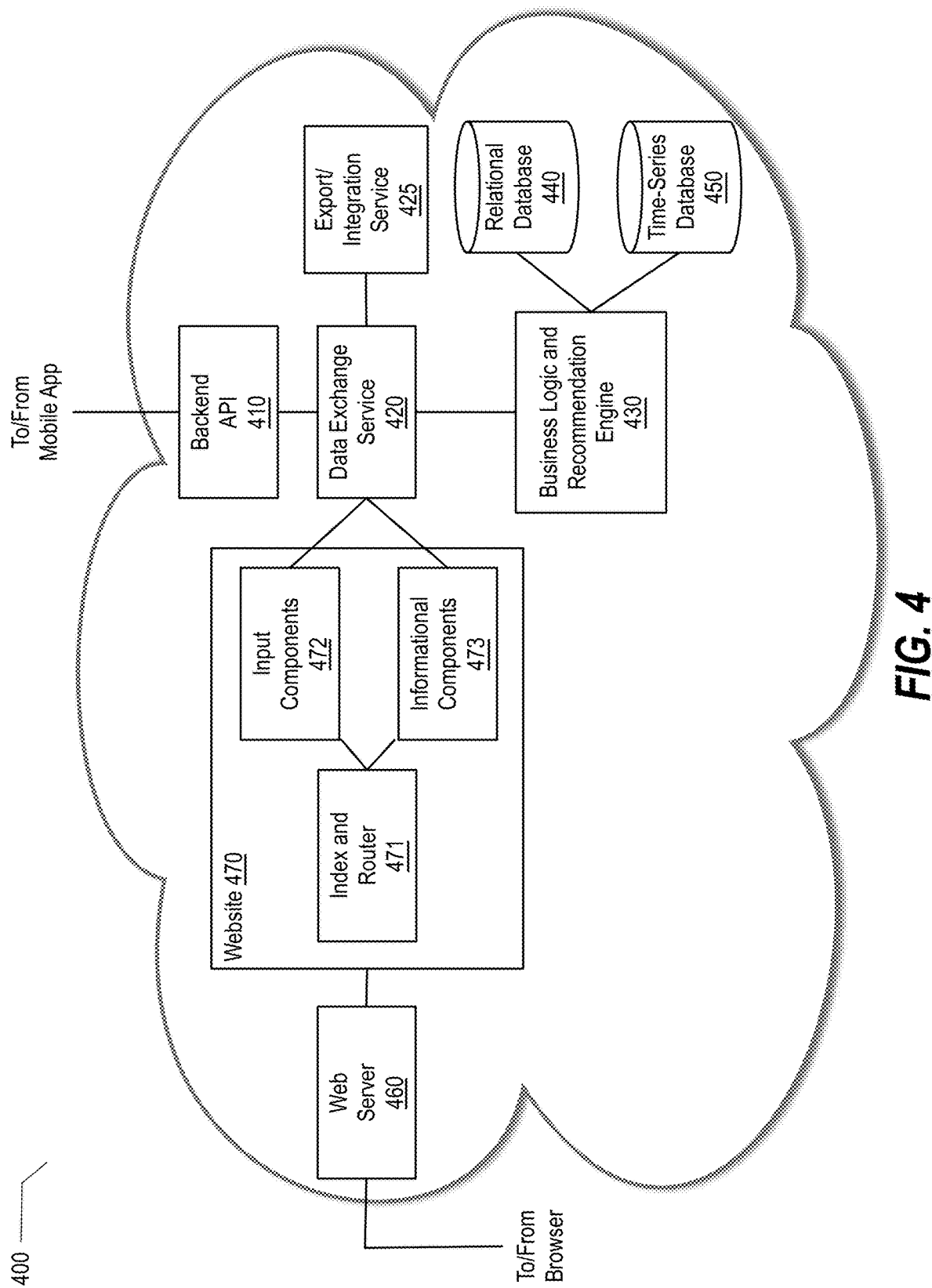
FIG. 4 is a block diagram illustrating cloud services in accordance with an embodiment of the present disclosure.

FIG. 4 is a block diagram illustrating cloud services 400 in accordance with an embodiment of the present disclosure. Cloud services 400 (which may be analogous to cloud services 140) may represent services provided to a user (e.g., user 101) via a public cloud service provider, for example, in relation to usage of an ear device (e.g., ear device 110 or 200, analysis of sleep data collected/logged by the ear device, and/or recommendations regarding how to achieve better sleep based on evaluation of user completed sleep questionnaires, device parameters established by the user, and/or past or current alert or notification profiles (which may also be referred to herein as sleep profiles). In the context of the present example, cloud services 400 include two separate entry points. (i) a web server 460, which may be used to access cloud services 400 via a browser and (ii) a backend API 410 through which a mobile app (e.g., mobile app 131 or 310) may access the cloud services 400.

The cloud services 400 may also include a website 470, a data exchange service 420, export/integration service 425, a business logic and recommendation engine 430, a relational database 440, and a time-series database 450. The website 470 is shown including an index and router 471, input components 472, and informational components, which may generally correspond to the functionality provided by the index level 320, input components 350, and informational components 340 of FIG. 3.

The data exchange service 420 (like data exchange service 360) may be responsible for facilitating communication with the mobile app via the backend API 410, including, for example, taking data structured in accordance with a source (first) schema used by the cloud services 400 and transforming it into a target (second) schema used by the mobile app and vice versa to support storage of data received from the mobile app and retrieval of data requested by the mobile app.

The business logic and recommendation engine 430 may be responsible for storing, among other things, user data, profiles, and answers to sleep questionnaires within the relational database 440 and storing time-series data associated with sleep sessions to the time-series database 450. The business logic and recommendation engine 430 may also employ machine-learning (ML) techniques to make recommendations to the user regarding how to improve their sleep and/or usage of the ear device. For example, based on an observed correlation between days on which the user consumed alcohol and/or caffeine and feedback from the user regarding not feeling well-rested the following morning, the business logic and recommendation engine 430 may recommend the user abstain from consuming alcohol and/or caffeine. Similarly, based on the user's alert profile, a number of times the user was alerted by the ear device for being in a sleep position within their configured positional sleep therapy alert zone, and feedback from the user indicating existence of excessive daytime sleepiness, the business logic and recommendation engine 430 may suggest the user adjust one or more parameters of the alert profile, for example, increasing or decreasing the size of the positional sleep therapy alert zone, increasing or decreasing the volume of alerts (audible notifications), increasing or decreasing a number of alerts before disabling or squelching the alerts, changing a type of sound or pattern of sounds associated with the alerts, and/or increasing or decreasing a ramp associated with a time delay change between alerts or a volume level change between alerts.

The export/integration service 425 (like export service 38) may be used to create exports for use by and/or integration with external medical systems, devices, or applications (e.g., an EMR solution) by, for example, exporting the logged time-series data in an appropriate format (e.g., CSV, OSCAR, or the like). Such data exports of time-series data associated with one or more user sleep sessions may also facilitate evaluation of a user's symptoms or diagnosis of a sleep respiratory issue by a medical professional.

Example Task Communication

Figure 5:
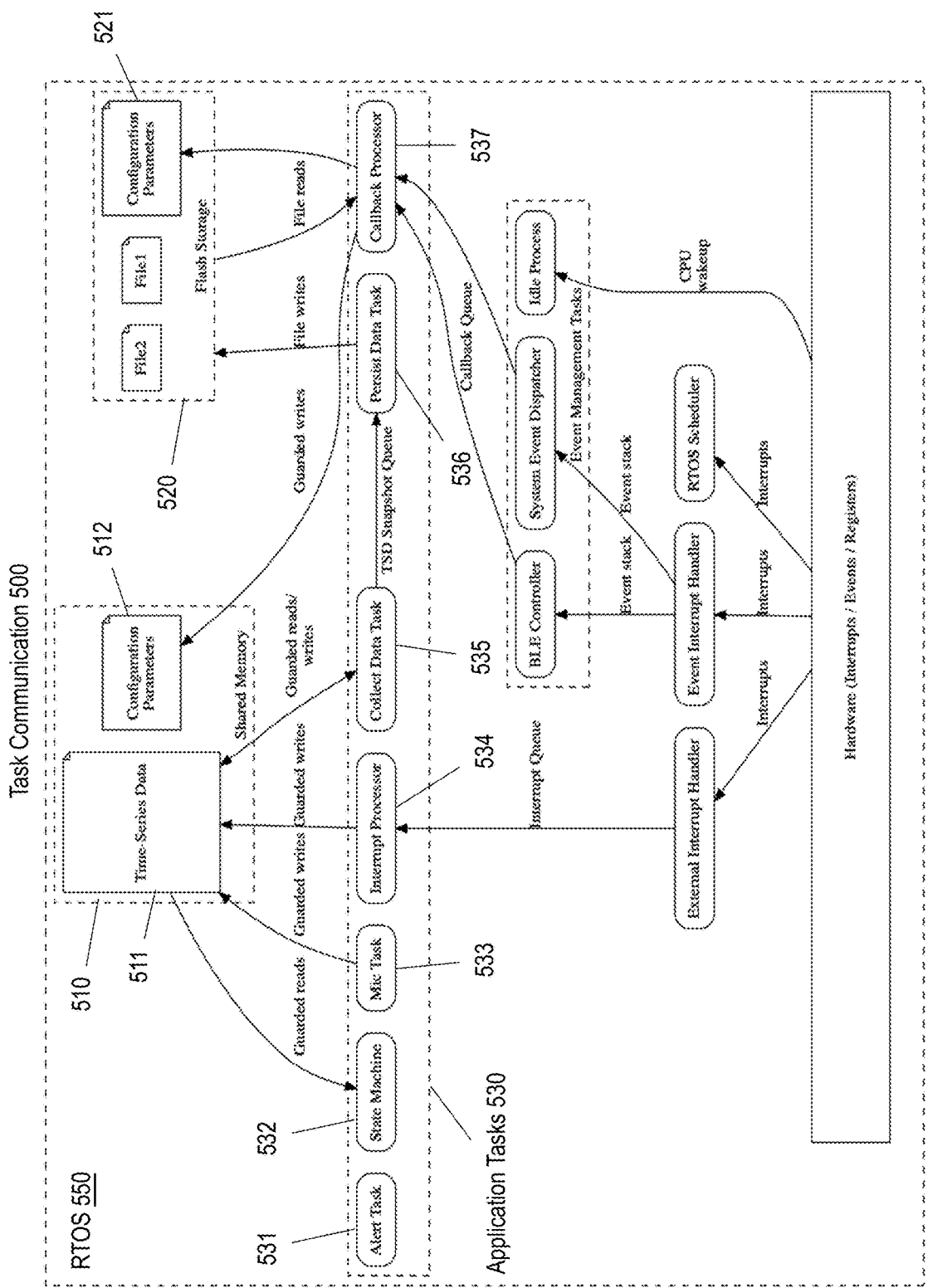
FIG. 5 is a block diagram illustrating task communication involving various application tasks in accordance with an embodiment of the present disclosure.

FIG. 5 is a block diagram illustrating task communication 500 involving various application tasks 530 in accordance with an embodiment of the present disclosure. In the context of the present example, it is assumed a processing resource (e.g., processor or microcontroller 245) of an ear device (e.g., ear device 110 or 200) executes a real-time operating system (e.g., RTOS 550). The RTOS 550 may receive interrupts and events, including, for example, time-based interrupts from in-memory registers that drive the RTOS 550 or interrupts or events from various internal or external sensors (e.g., oximeter 121, temperature sensor 210, microphone 215, and positional sensor 220), microcontroller devices (e.g., wireless transmitter 270), and/or integrated microcontroller peripherals (e.g., ADC peripheral 230, PDM peripheral 235, DAC peripheral 255, and PWM peripheral).

The application tasks 530 may make use of a shared memory 510 and flash storage 520 managed by the RTOS 550. According to one embodiment, the shared memory 510, for example, within a RAM (e.g., RAM 225) may be used to store time-series data 511 in a shared data structure accessible by the application tasks 530. A non-limiting examples of time-series data 511 are described below with reference to FIG. 15. Configuration parameters 512 (representing a copy of configuration parameters 521) may also be stored within the shared memory 510 for use by those of the application tasks 530 having a need. The flash storage 520 may be used by the persist data task 536 to persist snapshots of the time-series data 511, for example, corresponding to sleep data collected during a given monitoring interval in the form of files to be transferred via a wireless transmitter (e.g., wireless transmitter 270) to an intermediate computer system, for example, computer system 150 or a mobile device (e.g., smartphone 130) for storage to the cloud (e.g., cloud services 140 or 400). The flash storage 520 may also store configuration parameters 521. The configuration parameters 521 may include parameters that configure the operation of the ear device. As described further below, some of the configuration parameters 521 may be set based on user configured sleep profile attributes. Non-limiting examples of configuration parameters 512 and 521 are described below with reference to FIG. 16. Non-limiting examples of user configured sleep profile attributes are described below with reference to FIG. 9.

When nothing is scheduled and no interrupts are happening, the RTOS 550 may perform an idle process (which shuts down various clocks, buses, components and peripherals to save power). When interrupts or events are present, the RTOS 550 may route them to corresponding interrupt handlers (e.g., an external interrupt handler, an event interrupt handler, or an RTOS scheduler). The event interrupts may be handed off through an event stack to higher-level tasks, for example, which may manage, among other things. BLE communications and the universal serial bus (USB) connection coming online (e.g., representing the ear device being placed in the dock). External interrupts may be added to an interrupt queue for handling by an interrupt processor task 534.

In the context of the present example, the application tasks 530 include an alert task 531, a state machine task 532, a microphone task 533, the interrupt processor task 534, a collect data task 535, a persist data task 536, and a callback processor task 537. As described further below, the alert task 531 may be started as needed, for example, to generate alerts in the form of audible sound to a user (e.g., user 101) of the ear device via a speaker (e.g., speaker 275). Similarly, the microphone task 533 may be started as needed, for example, responsive to an interrupt from a microphone (e.g., microphone 215) of the ear device indicating the microphone has detected sound, thereby allowing the sound to be processed, evaluated, classified (e.g., as a breathing sound, as an environmental sound, as a heart sound, etc.), logged, and/or recorded as appropriate. The interrupt processor task 534 may monitor for and handle hardware interrupts (e.g., from internal or external sensors), for example, representing the availability of new or changed sensor data to be logged within the time-series data 511. A given external interrupt may represent a state change indicative of user movement received from a positional sensor (e.g., positional sensor 220), data ready from a positional sensor (e.g., positional sensor 220), a change in body temperature measured by a temperature sensor (e.g., temperature sensor 210), a change in SpO2 measured by an oximeter or a pulse oximeter (e.g., pulse oximeter 121), detection of sound via a microphone (e.g., microphone 215). The logging of sensor data (e.g., by the microphone task 533 and the interrupt processor task 534) to the time-series data 511 may be serialized to avoid concurrent writing by multiple application tasks 530, for example, by way of guarded writes (e.g., using a write lock, such as a semaphore or mutex).

The collect data task 535 may record data from various sensors and registers on a regular basis and may periodically (e.g., at the end of every monitoring interval) extract a snapshot of the current time-series data 511 generated during the current monitoring interval and queue it for storage to the flash storage 520 by the persist data task 536. According to one embodiment, the persist data task 536 runs periodically (e.g., every couple minutes or so) and appends the queued snapshot into files within the flash storage 520 in which each file may represent sleep data collected during one sleep session.

The callback processor 537 may be responsible for handling events relating to wireless data received from the intermediate computer system. The wireless data may represent BLE events, for example, receipt of a BLE packet or a BLE command (e.g., a calibration command, a parameter configuration, etc.) associated with a BLE controller. The callback processor may receive one or more configuration parameters 521 and make them accessible to the other application tasks 530 in the form of configuration parameters 512 by copying them to the shared memory 510. The configuration parameters 521 may be modified via an application (e.g., app 131 or mobile app 310) associated with the ear device and may be received by the ear device from the intermediate computer system via wireless communication. The callback processor 537 may also be responsible for transferring the files of time-series data to the intermediate computer system, for example, via a BLE controller. The files may then be subsequently transferred from the intermediate computer system to the cloud, for example, via the application.

The state machine task 532 may be responsible for determining the current state of the ear device (e.g., an alert or alarm state, a standby state, etc.), periodically monitoring the time-series data 511 and the configuration parameters 512 (e.g., each monitoring interval), and making decisions on actions to take based on observations made regarding the time-series data 511, the configuration parameters 512, and a set of rules (not shown). A non-limiting example of the conceptual flow of the state machine task 532 encoded by the set of rules is described further below with reference to FIG. 6.

While in the context of the present example, the ear device is described as a self-contained device that locally makes decisions regarding actions to take based on the current state of the ear device, new data (e.g., time-series data and/or configuration parameters), and a set of rules, it is to be appreciated in alternative embodiments, processing may be performed in a distributed manner with a first subset of the processing (e.g., data collection and alerting) being performed by the ear device and a second subset of the processing (e.g., evaluation of the collected data and determining an action to take) being performed by the application. For example, the ear device may stream sensor data (e.g., position data received from the positional sensor) to the application and receive direction from the application regarding what action, if any, to perform.

Example Ear Device State Machine Flow

Figure 6:
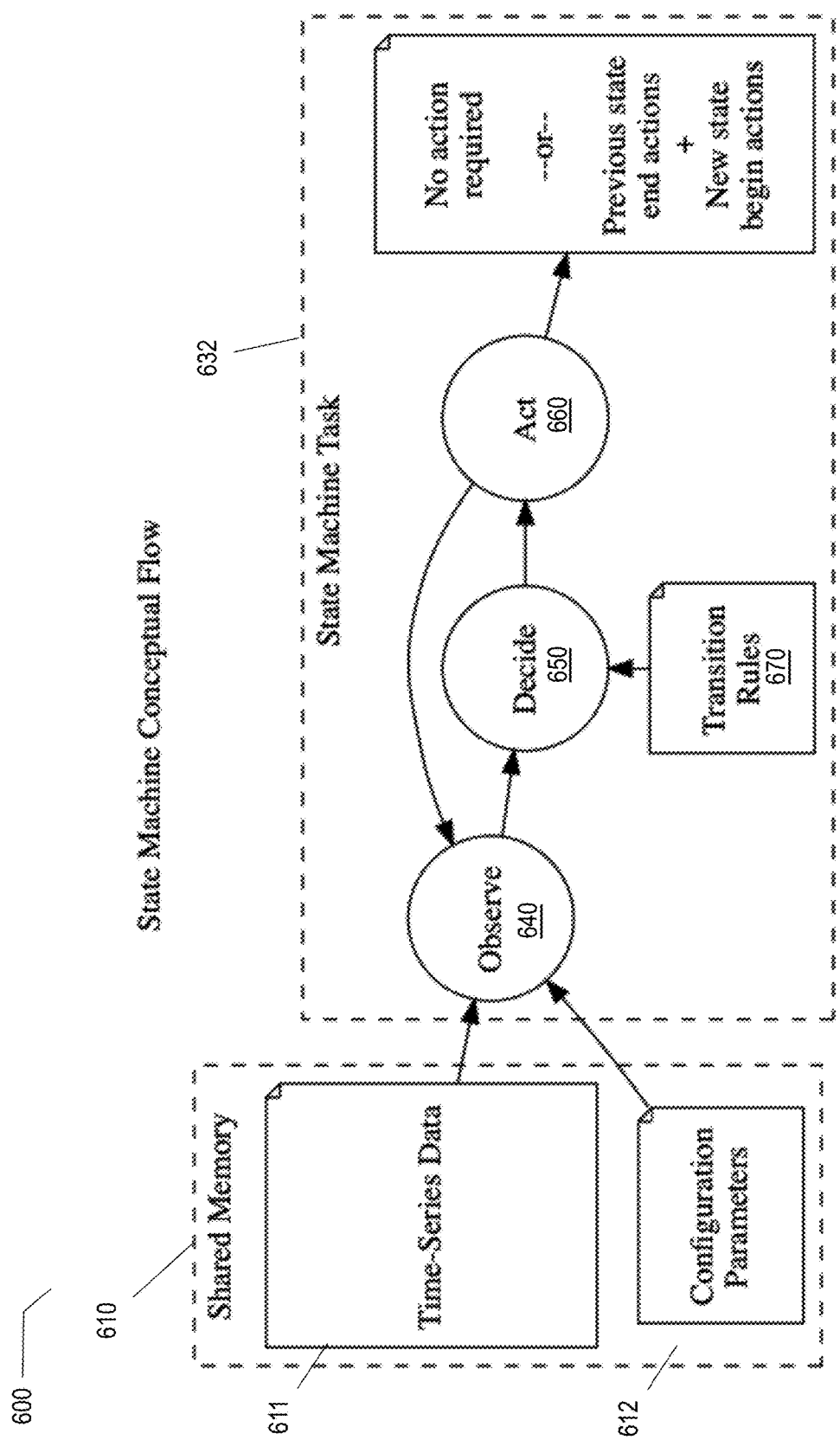
FIG. 6 is a block diagram conceptually illustrating state machine flow in accordance with an embodiment of the present disclosure.

FIG. 6 is a block diagram conceptually illustrating state machine flow 6X) in accordance with an embodiment of the present disclosure. According to one embodiment, the state machine flow 600 is executed by a processing resource (e.g., processor or microcontroller 245) of an ear device (e.g., ear device 110 or 200). The state machine flow 600 may represent the transitions between states of a state machine task 632 (which may be analogous to state machine task 532). In the context of the present example, the various phases of the state machine task 632 include an observe phase 640, a decide phase 650, and an act phase 660. The observe phase 640 evaluates time-series data 611 (which may be analogous to time-series data 511) and configuration parameters 612 (which may be analogous to configuration parameters 512) stored within shared memory 610 (which may be analogous to shared memory 510). Based on the sleep data collected and written to the time-series data 611, for example, by a set of application tasks (e.g., application tasks 530) and/or availability of one or more updated values for the configuration parameters 612, the state machine task 632 transitions from the observe phase 640 to the decide phase 650. According to one embodiment, the cadence at which new data is available in the time series data 611 (e.g., sampled or read from the various sensors of the ear device and stored to the time-series data 611) and hence how frequently the state machine task 632 runs may be configured via a standby delay time specified within the configuration parameters 612.

The decide phase 650 is responsible for making a decision regarding whether to transition from one ear device state to another based on the new data observed and a set of transition rules 670, which may be expressed in the form of conditional expressions involving one or more variables. For example, when the new data represents a sleep position (e.g., head orientation) of the user (e.g., user 101) that is within a sleep therapy alert zone (which may also be referred to herein simply as an alert zone) established by the user, the state machine task 632 may cause the ear device state to transition from a standby state to an alarm state during which the user may be provided with an audible notification to prompt the user to alter their sleep position. Non-limiting examples of ear device states and the set of transition rules 670 are described further below with reference to FIG. 7. After a decision has been made regarding whether to transition to a new ear device state or remain in the current (previous) car device state, the state machine task 632 transitions from the decide phase 650 to the act phase 660.

The act phase 660 is responsible for determining whether action is called for based on the prior ear device state and the new car device state. When changing ear device states (e.g., the previous ear device state and the new ear device state differ), the act phase 660 causes the end actions from the previous ear device state to be performed and the begin actions for the new ear device state to be performed. For example, when transitioning from the standby state to the alarm state, an alert task (e.g., alert task 531) may be started. After processing associated with the act phase 660 is completed, the state machine task 632 loops back to the observe phase 640 and the observe, decide, act pattern continues at the configured cadence.

While in the context of the present example, the state machine task 632 is described as observing new data in the time-series data 611 and/or the configuration parameters 612, deciding an appropriate ear state transition to make, if any, based on the observations and the transition rules 670, and carrying out the appropriate action in the act state 660, as noted above, in other examples, processing may be distributed between the ear device and the application. For example, the ear device may collect and log time-series data, stream the logged time-series data to the application for processing by the application, and receive and perform actions as directed by the application.

Example State Transition Diagram Among Ear Device States

Figure 7:
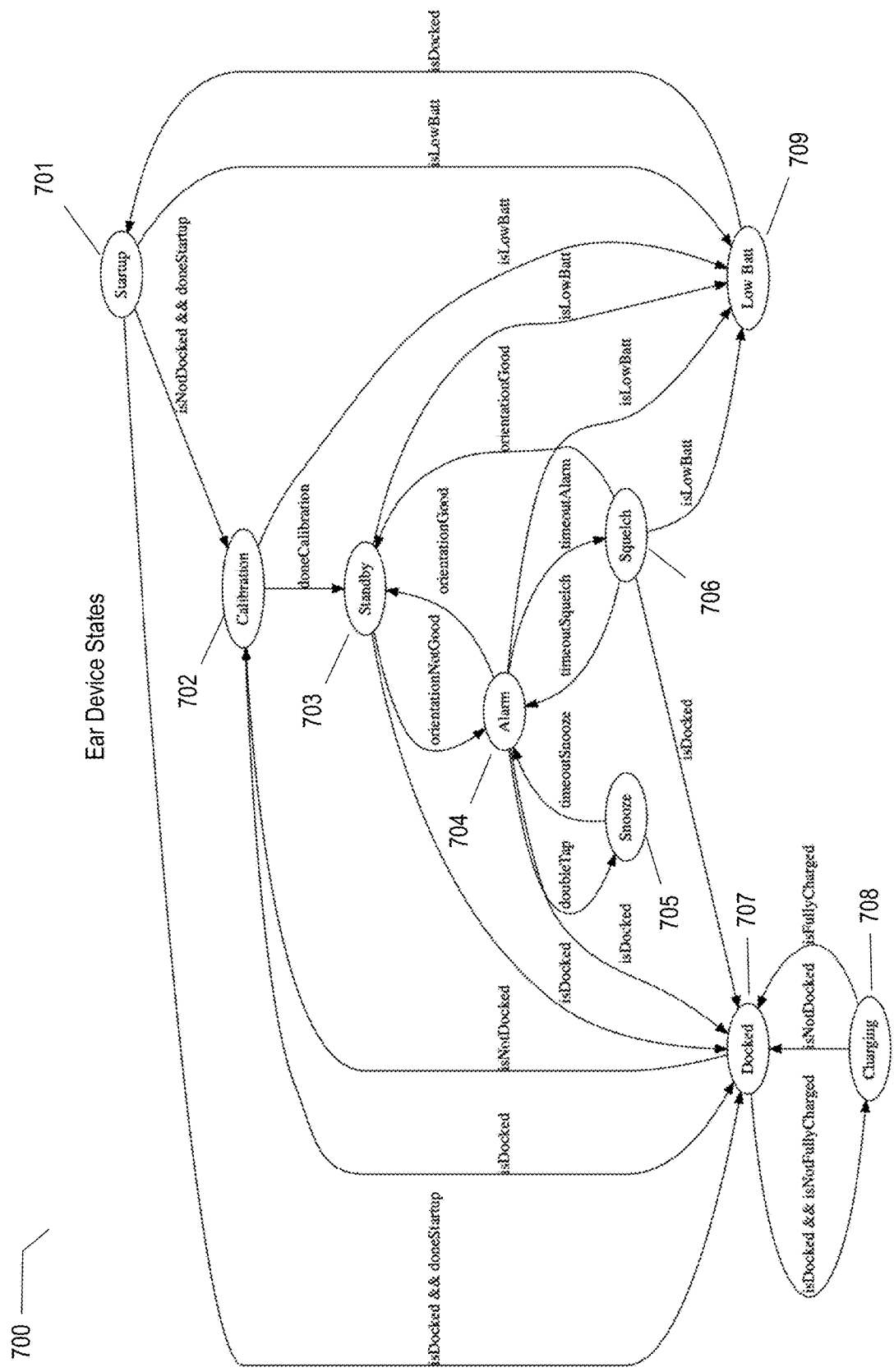
FIG. 7 is a state transition diagram illustrating ear device states in accordance with an embodiment of the present disclosure.

FIG. 7 is a state transition diagram illustrating ear device states 7M) in accordance with an embodiment of the present disclosure. In the context of the present example, the ear device states 700 include a startup state 710, a calibration state 720, a standby state 703, an alarm state 704, a snooze state 705, a squelch state 706, a docked state 707, a charging state 707, and a low battery state 709. The edges between the states represent a non-limiting example of the transition rules 670 of FIG. 6.

The calibration state 702, the standby state 703, the alarm state 704, the snooze state 705, and the squelch state 706 represent normal operating conditions of the ear device (e.g., ear device 110 or 200). The docked state 707 and the charging state 708 represent states in which the ear device is in the dock (or charging station). The startup state 701 and the low battery state 709 are states for handling special cases.

The ear device (e.g., ear device 110 or 200) may perform startup processing, for example, booting and loading of the operating system (e.g., RTOS 550) in the startup state 701. From the startup state 710, the ear device state may transition to the docked state 707, the calibration state 702, or the low battery state 709 based on one or more of whether the car device is in the dock, startup processing has been completed, and the battery voltage.

The calibration state 702 represents a state in which the pointing angle/vector of the ear device may be configured by the user (e.g., user 101). Calibration of the pointing angle/vector of the ear device may include reading the current pointing vector of a positional sensor (e.g., positional sensor 220) of the ear device responsive to user input and saving the calibrated pointing angle/vector as a rotational reference point to which subsequent pointing vectors of the positional sensor may be compared. According to one embodiment, completion of the calibration of the pointing angle/vector triggers the start of a sleep session. Calibration of the ear device pointing angle/vector is described further below with reference to FIGS. 10A-B. From the calibration state 702, the ear device state may transition to the docked state 707, the standby state 703, or the low battery state 709 based on one or more of whether the ear device is in the dock, calibration processing has been completed, and the battery voltage.

The standby state 703 represents a normal waiting state in which the ear device remains until the ear device pointing angle/vector moves into the configured alert zone, or responsive to the ear device being docked or the charge of the battery (e.g., rechargeable battery 265) being low. From the standby state 703, the ear device state may transition to the docked state 707, the alarm state 704, or the low battery state 709 based on one or more of whether the ear device is in the dock, whether the user's sleep position (e.g., head orientation) is within the alert zone, and the battery voltage.

The alarm state 704 may be responsible for generating an alarm set (e.g., a set of one or more user-configurable audible notifications), which may have a number of associated user-configurable attributes, for example, associated with a sleep profile. The user-configurable attributes may include, among others, a type of sound (e.g., a tone or a sampled sound), a start volume level, an end volume, a rate of repetition, and a number of times to repeat the alarm. Non-limiting examples of user-configured sleep profile attributes, including attributes of the alarm set, are described below with reference to FIG. 9. From the alarm state 704, the ear device state may transition to the docked state 707, the snooze state 705, the squelch state 706, or the low battery state 709 based on one or more of whether the ear device is in the dock, whether the user has snoozed the alarm, for example, via input to an application (e.g., app 131 or mobile app 310) associated with the ear device or to the car device (e.g., a double tap), whether the alarm has timed out, and the battery voltage.

The snooze state 705 represents a state in which the user has snoozed the alarm set. The snooze state 705 may be responsible for delaying an amount of time indicated by an alert snooze time before transitioning back to the alarm state 704. According to one embodiment, the user may snooze the alarm set by issuing a snooze command to the ear device. The snooze command may be issued via a user interface of the application or by tapping the ear device, for example, a single finger tap or a sequence of two or more taps in rapid succession (e.g., a double tap).

The squelch state 706 represents a state in which the alarm set has timed out (e.g., after the user has been alerted for the user-configurable number of alerts). The squelch state 706 may be responsible for restarting the alerting process by returning to the alarm state upon expiration of a squelch timer. From the squelch state 706, the ear device state may transition to the alarm state 704, the docked state 707, or the low battery state 709 based on one or more of whether the ear device is in the dock, whether the squelch timer has expired, and the battery voltage.

The docked state 707 represents a state in which the ear device is engaged with the dock. According to one embodiment, placing the ear device in the dock represents the end of a sleep session. The docked state 707 may be responsible for reactivating a wireless connection, for example, via a wireless transmitter (e.g., wireless transmitter 270) with a mobile device (e.g., smartphone 130) running the application, initiating the transfer of time-series data (e.g., time-series data 511) to the application, and causing the application to perform post sleep session processing (e.g., prompting the user to answer a sleep session questionnaire, presenting a sleep session summary to the user, and storing the time-series data to the cloud). From the docked state 707, the ear device state may transition to the charging state 708 or the calibration state 702 based on one or more of whether the ear device is in the dock and whether the battery is fully charged.

The charging state 708 represents a state in which the ear device is engaged with the dock and the battery is actively being recharged. From the charging state 708, the ear device state may transition to the docked state 707 responsive to the ear device being removed from the dock or responsive to the battery being fully charged.

The low battery state 709 represents a protective state in which the ear device may be shut off to avoid damage to the battery. In the context of the present example, the ear device may reboot to come out of the low battery state 709. For example, from the low battery state 708, the ear device state may transition through the startup state 701 to the docked state 707, and then to the charging state 708 responsive to being placed in the dock.

While in the context of the state diagrams (e.g., FIGS. 6-7) described and illustrated herein a number of enumerated states are included, it is to be understood that examples may include additional states before, after, and/or in between the enumerated states. Similarly, in some examples, one or more of the enumerated states may be omitted and/or transition to different states.

Example Sleep Session Processing

Figure 8:
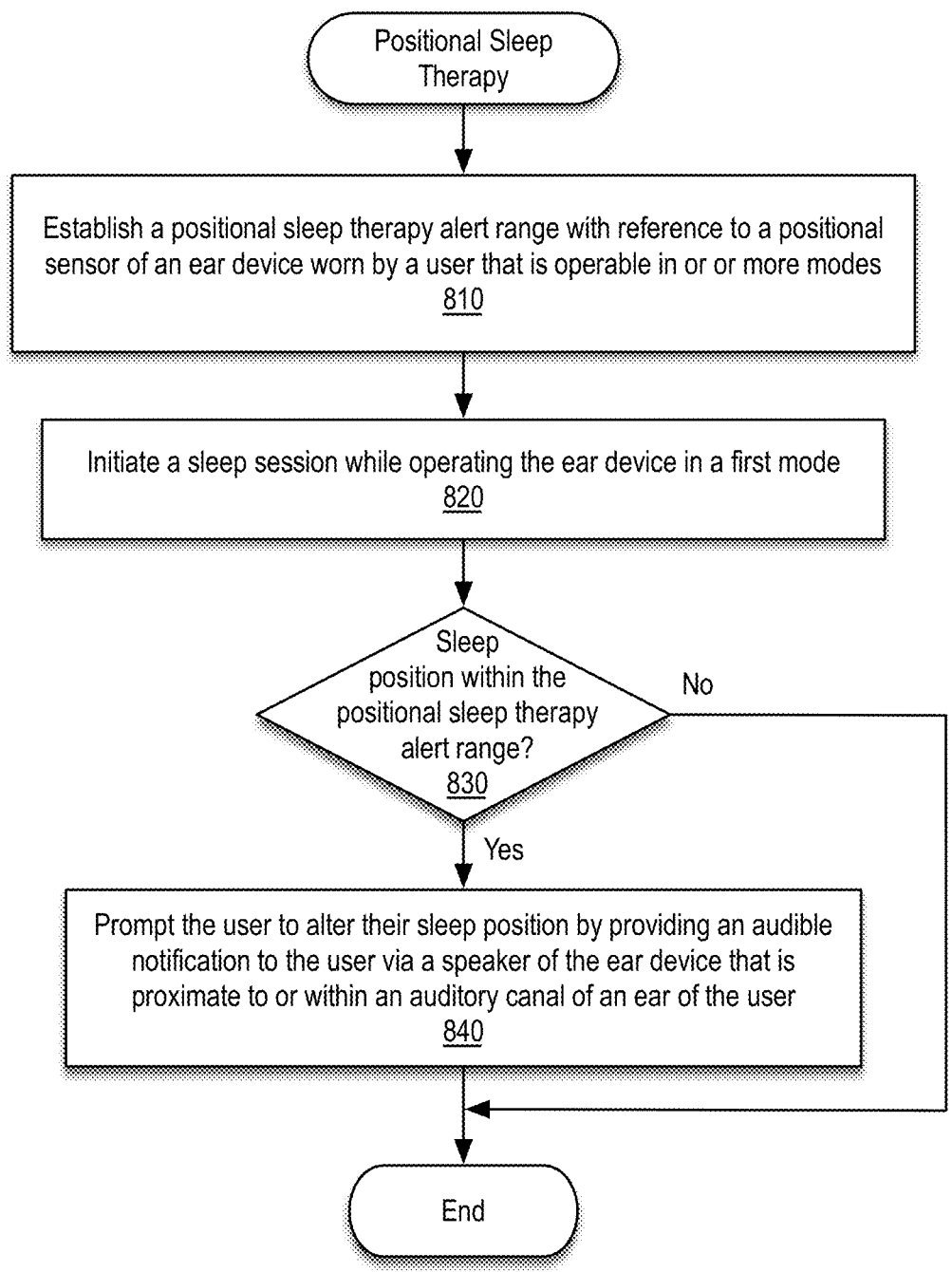
FIG. 8 is a high-level flow diagram illustrating operations for sleep session initialization and prompting a user when the user's sleep position is outside of a positional sleep therapy alert range in accordance with an embodiment of the present disclosure.

FIG. 8 is a high-level flow diagram illustrating operations for sleep session initialization and prompting a user when the user's sleep position is outside of a positional sleep therapy alert range in accordance with an embodiment of the present disclosure. The processing described with reference to FIG. 8 may be performed by an ear device (e.g., ear device 110 or 200) worn by the user (e.g., user 101) in their ear during a sleep session. A non-limiting example of how the ear device may sit within the concha of the ear of the user is described below with reference to FIG. 22.

At block 810, a positional sleep therapy alert range is established with reference to a positional sensor (e.g., positional sensor 220) of the ear device. The ear device may be operable in one or more modes. For example, as described above, the ear device may include a notification (or therapeutic) mode and a logging (or diagnostic) mode. According to one embodiment, the positional sleep therapy alert range may be established during a calibration state (e.g., calibration state 702) of the ear device. With the ear device seated within the user's ear, the user may assume a particular position with their head resting on a pillow and issue a calibration command to the ear device, for example, via input to an application (e.g., app 131 or mobile app 310) associated with the ear device or to the ear device (e.g., in the form of a single finger tap or a sequence of two or more taps in rapid succession). The calibration may define a pointing angle of the ear device based on the current X, Y, and Z orientation of the ear device in 3D space as indicated by the positional sensor of the ear device, thereby establishing a known frame of reference for the orientation of the ear device. An example of computations relating to establishment of a rotational frame of reference is provided below. The positional sleep therapy alert range or zone may then be defined with reference to the calibrated pointing angle and one or more predetermined or configurable offset angles. A non-limiting example of calibration of the ear device and establishment of the positional sleep therapy alert zone is described further below with reference to FIGS. 10A-B.

At block 820, a sleep session is initiated while operating the ear device in a first mode (e.g., the notification mode). The sleep session may be initiated automatically responsive to completion of the calibration of block 810 or may be initiated responsive to a further command from the user, for example, indirectly to the ear device via a user interface of the application (e.g., a start sleep session button) or directly to the ear device (e.g., via a tap or two or more taps in rapid succession). According to one embodiment, initiation of the sleep session causes the ear device to deactivate a wireless transmitter (e.g., wireless transmitter 270) of the ear device and initiate a monitoring cycle involving performing repeated measurements over time of the positional sensor and one or more optional sensors (e.g., an oximeter, a pulse oximeter, a temperature sensor, a microphone, etc.) associated with the ear device. For example, initiation of the sleep session may cause the ear device to start the observe, decide, act flow as described above with reference to FIG. 6.

At decision block 830, a determination may be made regarding whether the current sleep position of the user is within the positional sleep therapy alert range established in block 810. If so, processing continues with block 840. This determination may be made by measuring the current pointing angle/vector as provided by the positional sensor, comparing that pointing angle/vector against the configured reference pointing angle/vector as provided in the calibration state, and then computing if the current pointing angle/vector falls within the configured alert zone. Through that computation both the zAngle (1524 of FIG. 15—The angle between the current pointing angle/vector and the reference pointing angle/vector) is measured as well as the orientation of the ear device and user's head within the rotational frame of reference. From that orientation, both the zPitch (1525 of FIG. 15) and zRoll (1526 of FIG. 15) are calculated with respect to the rotational frame of reference. An example of computing zAngle is provided below.

At block 840, the user is prompted to alter their sleep position by providing an audible notification to the user via a speaker (e.g., speaker 275) of the ear device that is proximate to or within an auditory canal of the user's ear. The audible notification can consist of various recorded (sampled) and/or synthesized sounds (e.g. voice instructions, animal and environmental sounds, beeps, and/or tones) and may be part of an alert set including a number of user-configurable attributes defining, among other things, a type of sound (e.g., a tone or a sampled sound), a start volume level, an end volume, a rate of repetition, and a number of times to repeat the alarm. Non-limiting examples of user-configured sleep profile attributes, including attributes of the alarm set, are described below with reference to FIG. 9.

While for sake of brevity, in the context of the present example, only a single evaluation of the sleep position against the positional sleep therapy alert range is described, it is to be appreciated the sleep session monitoring may be periodically performed until a command is received from the user indicating the sleep session is complete, for example, by placing the ear device in the dock. For example, following block 840, processing may loop back to decision block 830 and the no branch of decision block 830 may loop back to decision block 830 after a delay and/or other intermediate processing (e.g., evaluation of alert set attributes, evaluation of sleep session end conditions, etc.). Further details regarding initiation of a sleep session and ending a sleep session are described below with reference to FIGS. 11 and 12.

While in the context of the present example, the wireless transmitter is described as being deactivated during a sleep session, it is to be appreciated, in an embodiment in which sleep session processing is distributed between the ear device and the application, the wireless transmitter may remain active. For example, in an implementation or mode in which the application is involved in the alerting process, the wireless transmitter may remain active and the ear device may stream position data received from the positional sensor to the application via the wireless transmitter and may receive commands (e.g., issue alarm, stop alarm, etc.) from the application via the wireless connection with the mobile device.

Example User-Configured Sleep Profile Attributes

FIG. 9 is a table 900 illustrating user-configured sleep profile attributes in accordance with an embodiment of the present disclosure. Table 900 includes a name column 910, a related configuration column 920, and a description column 930. The name column 910 indicates a name (e.g., Alert Hold Off) of a given user-configured sleep profile attribute, whereas the related configuration column 920 identifies the one or more corresponding internal configuration parameters (e.g., alertHoldffCount) that may be set based on the given user-configured sleep profile attribute. The various user-configured sleep profile attributes may initially be assigned default values.

The user (e.g., user 101) may customize their sleep experience by adjusting one or more of the user-configured sleep profile attributes over time via an application (e.g., app 131 or mobile app 310) associated with the ear device (e.g., ear device 110 or 200). For example, if the user is a deep sleeper or a light sleeper, they may wish to experiment with various combinations of Start Volume, End Volume, Alert Ramp, and Tone or Sample to see what values of these attributes work best for them. As another example, if the user does not wish to receive an immediate alert responsive to a (temporary) change in sleeping position that puts them within the alert zone, they may wish to set a longer Alert Hold Off value. As yet another example, if the user has difficulty promptly changing their sleeping position (e.g., due to weight, injury, or some other issue), they may wish to set a longer Alert Delays value to provide sufficient time to adjust their sleeping position before receiving another alarm.

According to one embodiment, the current configured set of values for the sleep profile attributes may be saved in the user's profile to facilitate reuse of sleep profile attribute values which the user finds satisfactory. In one embodiment, cloud services (e.g., cloud services 140 or 400) may evaluate input received from the user on a sleep questionnaire and provide recommendations to help the user achieve more restful sleep. Some of these recommendations may include one or more suggestions for adjusting one or more values of the sleep profile attributes. For example, if a recommendation engine (e.g., business logic and recommendation engine 430) determines based on its analysis of the time-series data (e.g., stored in time-series database 450) that the user is not responding well (e.g., the alerts are timing out more often than not and the user is not adjusting their sleep position responsive to the alerts) to audible notifications delivered in accordance with the current sleep profile attributes, the recommendation engine may suggest increasing one or more of the Start Volume, End Volume, and Alert Ramp or may suggest changing from Tone to Sample or vice versa.

Example Ear Device Pointing Angle Calibration and Alert Zone Monitoring

Figures 10A, 10B:
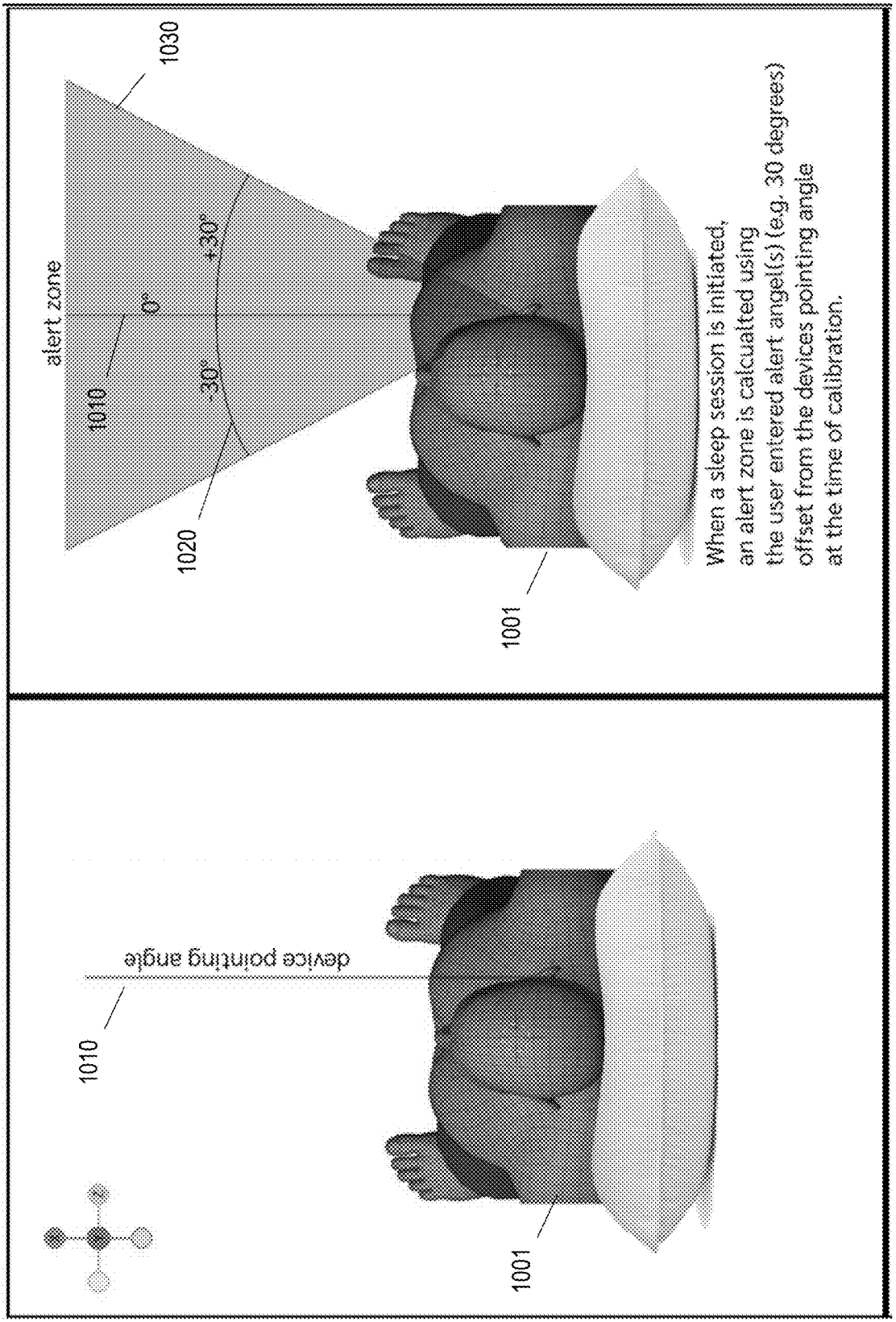
FIGS. 10A-B illustrate calibration of an ear device and establishment of a positional sleep therapy alert zone in accordance with an embodiment of the present disclosure.

FIGS. 10A-B illustrate calibration of an ear device and establishment of a positional sleep therapy alert zone in accordance with an embodiment of the present disclosure. Because ears are different and the way the ear device (e.g., ear device 110 or 200) is positioned within a given user's ear may differ from sleep session to sleep session, in one embodiment, prior to each sleep session, a user (e.g., user 1001, which may be analogous to user 101) may be prompted through an application (e.g., app 131 or mobile app 310) associated with the ear device to calibrate a device pointing angle 1010 for the ear device that may be read from a positional sensor (e.g., positional sensor 220) of the ear device. The calibrated device pointing angle 1010 may be used as a relative frame of reference for the orientation of the ear device in 3D space (or a rotational reference point) that may be subsequently used during a given sleep session as a point of comparison to sleep positions the user may find themselves in during the given sleep session.

In FIGS. 10A-B, the user 1001 is shown lying on his back and wearing the car device in his right ear. While somewhat arbitrary, for purposes of explanation in various examples described herein, the X axis refers to a vertical axis passing through the ear device, for example, parallel to a vertical line running between the user's nose and the posterior of the user's cranium, the Y axis refers to an axis passing through the ear device that is parallel to a line extending from the top of the user's skull to the user's neck, and the Z axis refers to a horizontal axis passing through the ear device side to side from one ear to the other. In this example, while lying on his back, the user has calibrated the device pointing angle 1010, to a zero degree angle from the X axis. While the device pointing angle 1010 may include an X component, a Y component, and a Z component, only the X component is shown in this example.

In one embodiment, calibrating the device pointing angle 1010 for a given sleep session also establishes an alert zone 1030 (which may also be referred to herein as a positional therapy sleep range or zone), for example based on a tare vector (e.g., tare X 1514, tare Y 1515, and tare Z 1516 of FIG. 15). The tare vector may be calculated by adding one or more predefined or configurable offset angles (e.g., alert angle 1612 of FIG. 16) to the calibrated device pointing angle 1010. In the present example, the offset angle 1020 used for both X and Y is 30 degrees and the alert zone 1030 is defined by inclusion of the calibrated device pointing angle 1010 within the alert zone 1030. In some embodiments, the alert zone may instead be defined to be the inverse of that shown in FIG. 10B, in which the (inverted) alert zone is defined by exclusion of the calibrated device pointing angle 1010 from the alert zone. In one embodiment, the alert zone 1030 remains fixed throughout the given sleep session, unless reconfigured by the user 1001.

Figures 10C, 10D:
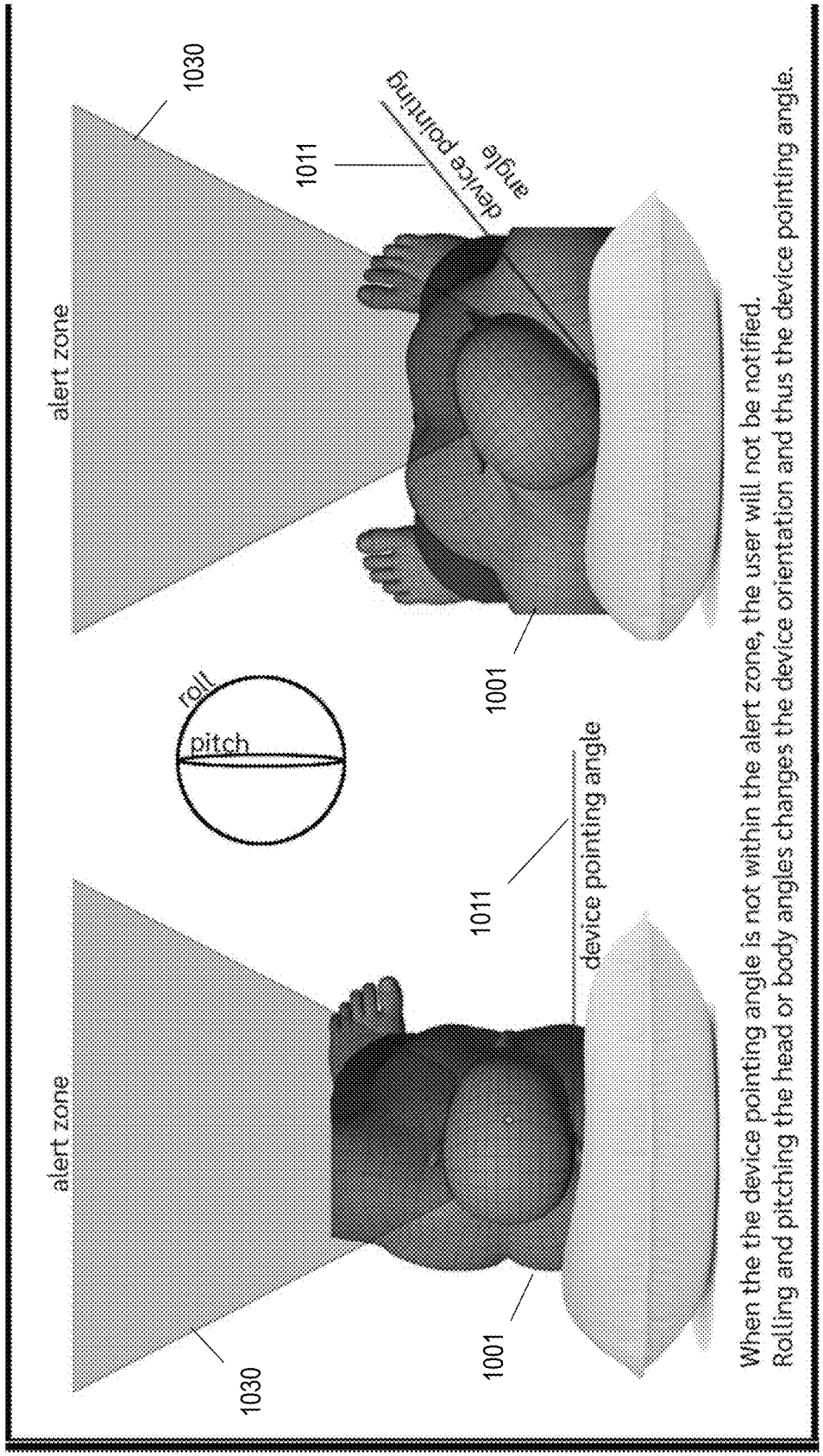
FIGS. 10C-D illustrate a head orientation of the user in which the current device pointing angle of the ear device is outside of the established positional sleep therapy alert zone in accordance with an embodiment of the present disclosure.

FIGS. 10C-D illustrate a head orientation of the user 1001 in which the current device pointing angle 1011 of the ear device is outside of the established positional sleep therapy alert zone 1030 in accordance with an embodiment of the present disclosure. FIGS. 10C-D illustrate how the rolling and pitching of the head or body angles of the user 1011 change the ear device orientation and thus the current device pointing angle 1011. The orientation of the user's head may be represented in the form of roll (rotation about a front-to-back axis perpendicular to the drawing page, for example, the Y axis), pitch (rotation about a side-to-side axis, for example, the Z axis), and yaw (rotation about the vertical axis, for example, the X axis). While sleeping, the user's head may move or rotate in three dimensions: yaw, head tilted left or right (e.g., ear toward or away from the shoulder); pitch, chin up and forehead down or chin down and forehead up; and roll, nose turned to the left or right. In one embodiment, roll, pitch, and yaw are measured relative to an established frame of reference represented by the calibrated zero-point position (e.g., the center of the alert zone 1030) based on a current absolute pointing angle (e.g., X 1511, Y 1512, and Z 1513 of FIG. 15) read from the positional sensor.

Continuing with the example started with reference to FIG. 10A, in FIG. 10C, it is assumed the user 1001 is now positioned on his side at this point in time during the sleep session. As can be seen, the current device pointing angle 1011 is not within the alert zone 1030. Therefore, no prompting of the user 1001 via an audible notification to alter their sleep position is warranted and no such prompting is performed. Similarly, in FIG. 10D, although the user 1011 is positioned on his back at this point in time during the sleep session, because the current device pointing angle 1011 is again not within the alert zone 1030, no prompting of the user 1001 via an audible notification is warranted and no such prompting is performed.

Figures 10E, 10F:
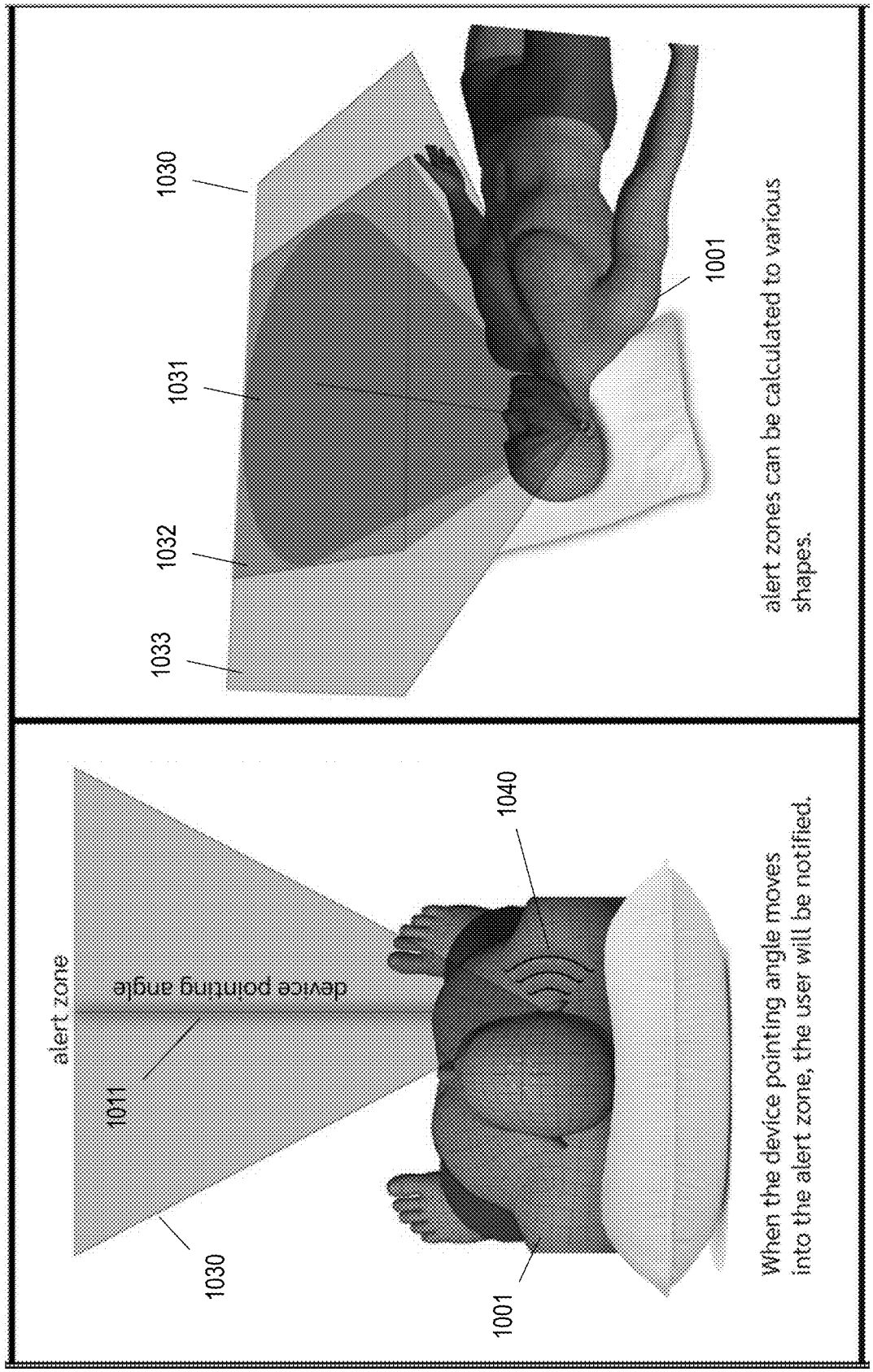
FIGS. 10E-F illustrate a head orientation of the user in which the current device pointing angle of the ear device is within the established positional sleep therapy alert zone in accordance with an embodiment of the present disclosure.

FIGS. 10E-F illustrate a head orientation of the user in which the current device pointing angle 1011 of the ear device is within the established positional sleep therapy alert zone 1030 in accordance with an embodiment of the present disclosure. Continuing with the example started with reference to FIG. 10A, in FIGS. 10E-F, it is assumed the user 1001 is again positioned on his back at this particular point in time during the sleep session. As can be seen, the current device pointing angle 1011 is now within the middle of the alert zone 1030. Therefore, delivery of an audible notification 1040 to the user 1001 via a speaker (e.g., speaker 275) to prompt the user 1001 to alter their sleep position is performed in this scenario.

As depicted in FIG. 10F, the alert zone 1030 may be calculated to various shapes (e.g., a conical shape 1031, a square pyramid 1032, and a rectangular pyramid 1033).

Example Identification/Notification of Potential Sleep Respiratory Issue

Figure 11:
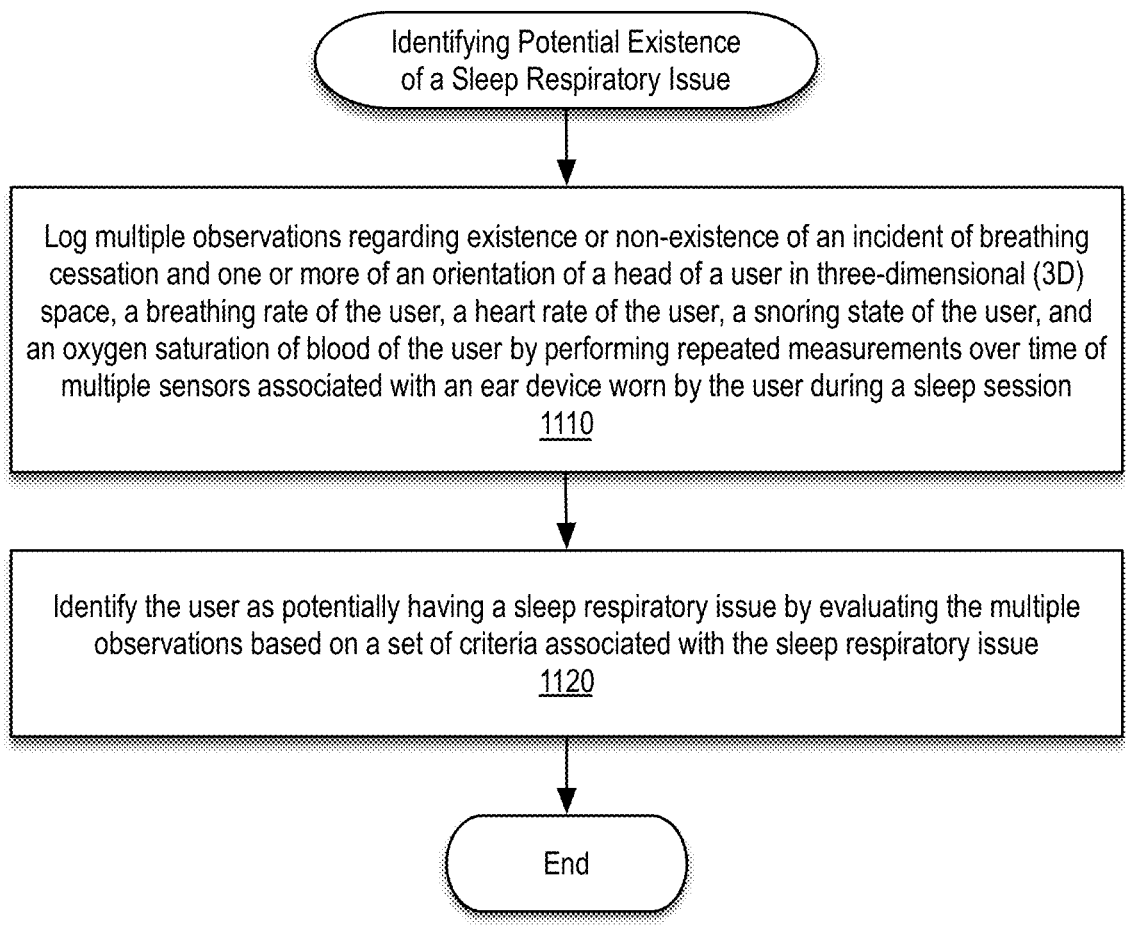
FIG. 11 is a high-level flow diagram illustrating operations for identifying a user as potentially having a sleep respiratory issue in accordance with an embodiment of the present disclosure.

FIG. 11 is a high-level flow diagram illustrating operations for identifying a user as potentially having a sleep respiratory issue in accordance with an embodiment of the present disclosure. The processing described with reference to FIG. 11 may be performed by a system (e.g., system 100) including (i) an ear device (e.g., ear device 110 or 200) worn by the user (e.g., user 101) in their ear during a sleep session and (ii) one or both of an associated application (e.g., app 131 or mobile app 310) and cloud services (e.g., cloud services 140 or 400). In one embodiment, the ear device may be operating in either a logging mode or a notification mode (with logging, for example, of time-series data (e.g., time-series data 511) enabled). Types of data that may be captured for report generation and/or export to facilitate diagnosis of various sleep respiratory issues by a medical professional are listed in FIG. 23. These same types of data may be analyzed by the application and/or the cloud services to infer the user has an unspecified sleep respiratory issue or a particular sleep respiratory issue when the data is sufficient to allow more specificity.

At block 1110, multiple observations regarding existence or non-existence of an incident of breathing cessation and one or more of an orientation of a head of the user, a heart rate of the user, a snoring state of the user, a body temperature of the user, and an oxygen saturation of blood of the user are logged by performing repeated measurements over time of multiple sensors associated with the ear device. According to one embodiment, the multiple sensors may include one or more of a positional sensor (e.g., positional sensor 220), an oximeter, a pulse oximeter (e.g., pulse oximeter 121), a microphone (e.g., microphone 215), and a temperature sensor (e.g., temperature sensor 210). In one embodiment, the sampling of the multiple sensors may be performed by one or more application tasks (e.g., application tasks 530) running within an RTOS (e.g., RTOS 550) of the ear device. Depending upon the particular implementation, the logging may be performed local to the ear device, for example, using one or both of a shared memory (e.g., shared memory 510) and flash storage (e.g., flash storage 520) during the sleep session and then the log (e.g., time-series data 511) may be subsequently transmitted to the associated application after completion of the sleep session or the observations may be streamed in real time or near real time to the application, which in turn performs the logging locally or to the cloud.

At block 1120, the user may be identified as potentially having a sleep respiratory issue by evaluating the multiple observations based on a set of criteria associated with the sleep respiratory issue. For example, the associated application may advise the user they should consult with a sleep or respiratory professional for potential existence of a sleep respiratory issue or otherwise notify them regarding observed symptoms indicative of the potential existence of a sleep respiratory issue.

In some embodiments, the evaluation of the multiple observations may be sufficient to provide the user with a more specific notification specifically identifying the potential sleep respiratory issue as one or more of snoring, positional snoring, positional UARS, SA, or PSA. As will be appreciated, advice provided by the application or cloud services to consult with a medical professional regarding an unspecified sleep respiratory issue or a specifically identified sleep respiratory issue that appears most likely based on analysis of the sleep data does not represent medical advice or constitute a medical diagnosis of a particular condition.

Rather, it is simply suggested here that based on the differences in symptoms among the various sleep respiratory issues, certain symptoms observed in the data captured by the ear device may facilitate distinguishing one potential sleep respiratory issue from the others and potentially informing the user of reasonable inferences that can be made given the available data. For example, when the number of observed incidents of breathing cessation exceed an SA threshold during a sleep session, it is more likely the user has some form of sleep apnea (e.g., central sleep apnea or OSA) than simply a snoring issue or UARS. When the number of observed incidents of breathing cessation exceed the SA threshold and there is a correlation between the observed incidents of breathing cessation and a particular sleep position (e.g., an orientation of the head of the user that is indicative of the user sleeping on their back in a nose-toward-the-ceiling orientation) or the majority of observed incidents of breathing cessation otherwise appear to be attributed to the orientation of the head of the user, then it may be inferred the user's SA is positional in nature and the user has PSA. When there are fewer incidents of breathing cessation (e.g., less than the SA threshold) and the user's oxygen saturation remains at or above an oxygen saturation threshold then it may be inferred the user more likely has UARS than some form of sleep apnea. When none of the above criteria are met but snoring sounds are identified during the sleep session, the user may be notified of the potential existence of a snoring issue. As with the other sleep respiratory issues, when there is a correlation of the incidence or non-incidence of snoring with particular sleep positions, then the snoring issue may be considered positional snoring.

Example Initiation of a Sleep Session

Figure 12:
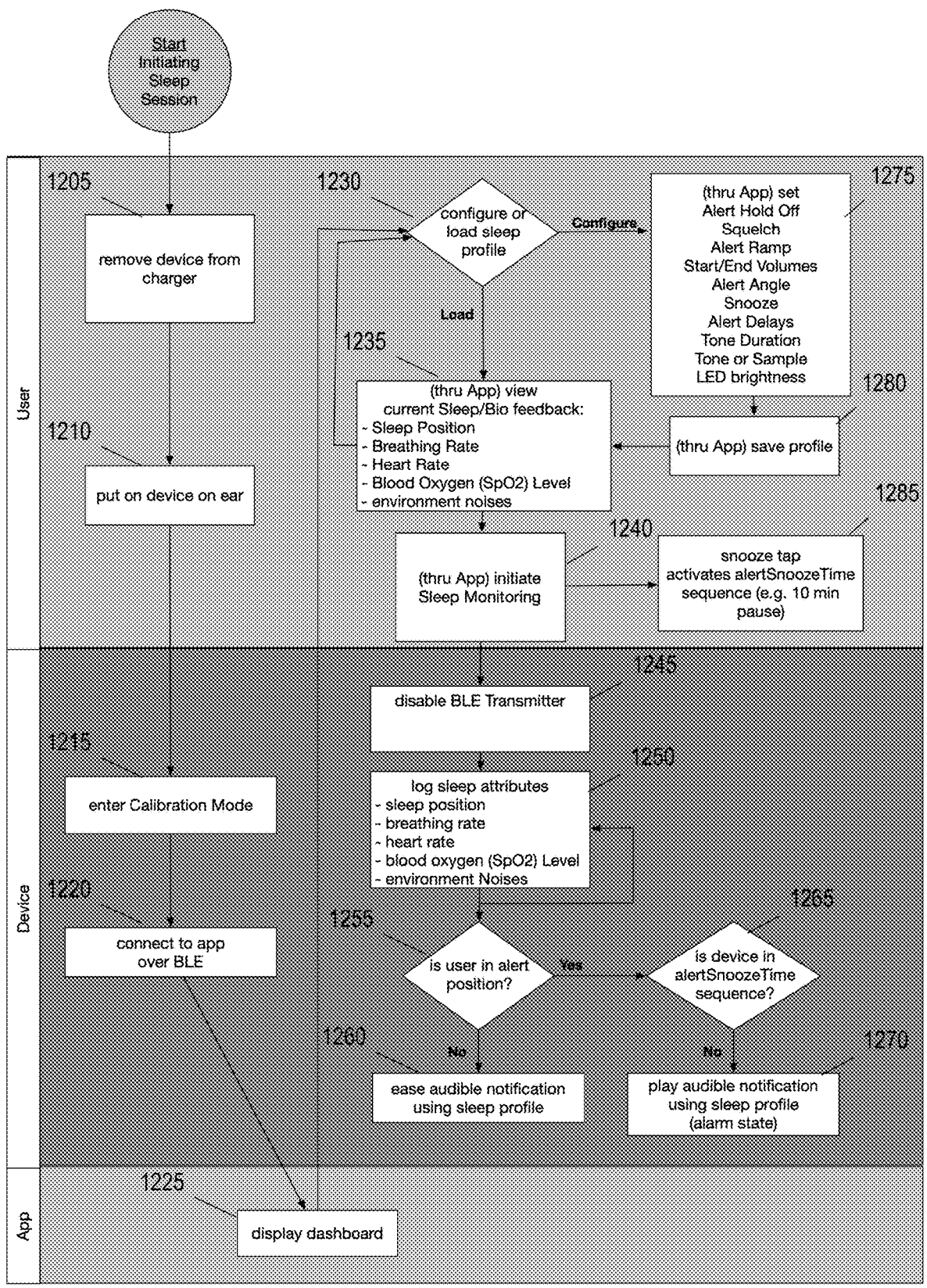
FIG. 12 is a flow diagram illustrating operations for initiating a sleep session in accordance with an embodiment of the present disclosure.

FIG. 12 is a flow diagram illustrating operations for initiating a sleep session in accordance with an embodiment of the present disclosure. In the context of FIG. 12, activities and/or processing performed by a user (e.g., user 101 or 1001), an ear device (e.g., ear device 110 or 200), and an application (e.g., app 131 or mobile app 310) associated with the ear device are shown in an upper portion, a middle portion, and a lower portion of the figure, respectively.

At block 1205, the user removes the device from the charger (e.g., a dock).

At block 1210, the user puts the ear device in their ear. According to one embodiment, when the ear device is seated properly in the concha of the user's ear, a speaker hole through which audible notifications created by a speaker (e.g., speaker 275) are directed out of the ear device, is located proximate to or within an auditory canal of the user's ear.

At block 1215, the ear device enters into a calibration mode (e.g., calibration state 702). Entry into the calibration mode may be triggered by removal of the ear device from the charger, responsive to automatic ear detection, and/or input by the user via tap(s) or via a user interface of the application. Examples of calibration of the pointing angle of the ear device are described above with reference to FIG. 7 (e.g., calibration state 702) and FIGS. 10A-B.

At block 1220, the ear device connects to the application via a wireless connection (e.g., BLE) between the ear device and a mobile device (e.g., smartphone 130) on which the application is running.

At block 1225, the application displays a dashboard of the application. The dashboard may allow the user to view, among other things, information regarding the last sleep session score and a summary of the last sleep session. The user may also be provided with an opportunity to test and/or adjust the current sleep profile (e.g., the user-configured sleep profile attributes described above with reference to FIG. 9) before beginning a new sleep session. The dashboard may also include an "initiate sleep" button to allow the user to start a sleep session (e.g., start sleep monitoring) immediately or after a predetermined or configurable amount of time.

At decision block 1230, the user may configure a new sleep profile or load a saved sleep profile. The saved sleep profiles can come from a previously user-saved sleep profile or a premade profile from the manufacturer. The premade sleep profiles could be designed to work best for specific sleep conditions (e.g. a light sleeper that snores, or a heavy sleeper with obstructive sleep apnea). A default profile could be preloaded by the manufacturer so the ear device will function in its default state. If the user selects loading of a saved sleep profile, sleep session initiation processing continues with block 1235. If the user selects configuration of a new sleep profile, sleep session initiation processing continues with block 1275.

At block 1235, the user may be presented through the application with real time feedback regarding sensor data available from the ear device, including one or more of the current sleep position, the current breathing rate, the current heart rate, the current blood oxygen (SpO2) level, and existence or non-existence of environmental noises currently observed by the ear device. From block 1235, the user may return to decision block 1230 or continue to block 1240.

At block 1275, the user may configure a new sleep profile for the anticipated sleep session via the application, including setting one or more of alert hold off, squelch, alert ramp, start/end volume, alert angle, snooze, alert delays, tone duration, tone or sample, and LED brightness.

At block 1280, the user may save the new sleep profile configured in block 1275.

At block 1240, the user may initiate sleep monitoring through the application. For example, the user may select the "initiate sleep" button.

At block 1285, at any time during the sleep session the user may perform a snooze tap (e.g., a finger tap or a series of two or more taps in rapid succession) on the housing of the car device to activate an alert snooze time sequence, for example, pausing the issuance of alerts or audible notifications by the ear device for a configured time period (e.g., 10 minutes).

At block 1245, the wireless transmitter (e.g., wireless transmitter 270) may be disabled.

At block 1250, sleep attributes are logged. For example, every 3 to 5 seconds and/or responsive to detection of movement or sound, sensor measurements indicative of, among other things, one or more of sleep position, for example, in the form of a current pointing angle/vector of a position sensor), breathing rate, heart rate, blood oxygen (SpO2) level, and environment noise may be logged. According to one embodiment, the user's breathing rate and/or heart rate may be determined by analyzing movements of the positioning sensor and/or by analyzing breathing and/or heart sounds received through a microphone (e.g., microphone 215) as described further below with reference to FIGS. 17-21.

According to one embodiment, the sleep attributes are logged within a memory of the ear device in the form of time-series data (e.g., time-series data 511). A non-limiting example, of various types of data that may be logged as part of the time-series data for a given sleep session is described below with reference to FIG. 15. As described further below, the capturing of time-series data during sleep sessions and the ability to selectively export such data (from the application and/or from cloud services (e.g., cloud services 140 or 400)) for a single sleep session or a set of sleep sessions facilitates the ability of a medical professional to make a diagnosis of the user as having a sleep respiratory issue. The exported data may be in the form of a report, a summary, and/or raw data.

At decision block 1255, a determination may be made regarding whether the user is in an alert position. For example, as new data is logged, the sleep position of the user (as indicated by a pointing angle/vector of the ear device) may be compared to a configured alert zone (e.g., alert zone 1030). If the user is in a sleep position representing an alert position, processing branches to decision block 1265; otherwise, processing continues with block 1260.

At decision block 1265, it is determined whether the ear device is in an alert snooze time sequence. If not, the ear device enters into an alert mode (e.g., alert state 704) and an audible notification is played to the user via the speaker in accordance with the active sleep profile. If so, such audible notifications are inhibited and no audible notification is provided to the user.

At block 1260, to the extent an audible notification is in process the sound may be gradually faded until stopped in accordance with the active sleep profile.

While for sake of brevity, in the context of the present example, only a single evaluation of whether the user is in an alert position is described, it is to be appreciated the sleep session monitoring may be periodically performed until a command is received from the user indicating the sleep session is complete, for example, by placing the ear device in the dock. For example, following blocks 1260 and 1270, processing may loop back to block 1250 to continue logging and evaluation of whether the user is in an alert position.

Example Ending of a Sleep Session

Figure 13:
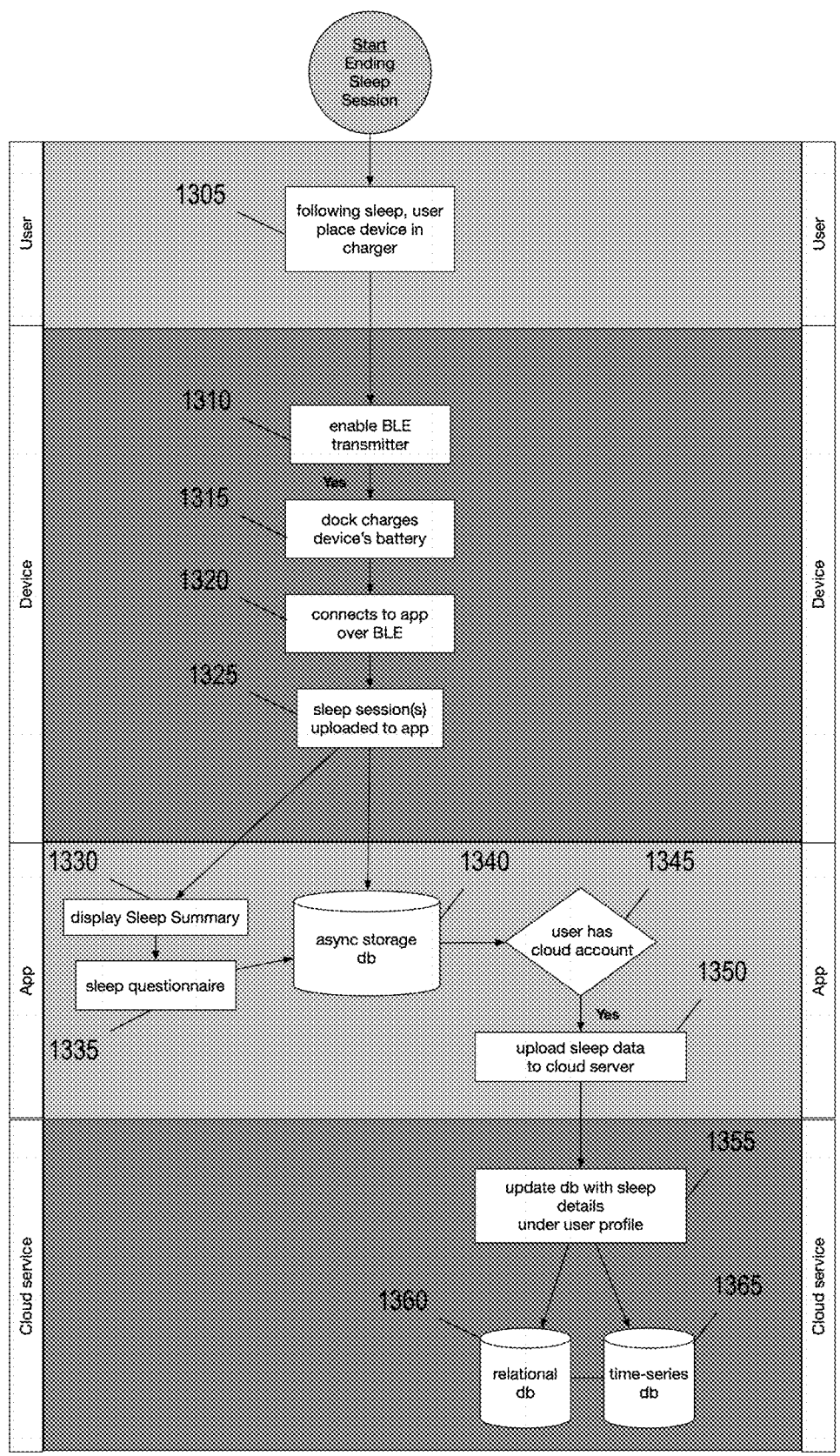
FIG. 13 is a flow diagram illustrating operations for ending a sleep session in accordance with an embodiment of the present disclosure.

FIG. 13 is a flow diagram illustrating operations for ending a sleep session in accordance with an embodiment of the present disclosure. In the context of FIG. 13, activities and/or processing performed by a user (e.g., user 101 or 1001, an ear device (e.g., ear device 110 or 200), an application (e.g., app 131 or mobile app 310) associated with the ear device, and cloud services (e.g., cloud services 140 or 400) are shown in a top portion, an upper middle portion, a lower middle portion, and a bottom portion of the figure, respectively. In the context of the present example, it is assumed prior to block 1305, the ear device was performing sleep monitoring as part of a current sleep session, for example, as described above with reference to FIG. 12.

At block 1305, the user may place the ear device in the charger (e.g., a dock) to end the current sleep session.

At block 1310, the wireless transmitter (e.g., wireless transmitter 270) may be enabled.

At block 1315, the ear device may enter into a docked mode (e.g., docked state 707) and commence charging of a battery (e.g., rechargeable battery 265) of the ear device as appropriate (e.g., if it is not fully charged).

At block 1320, the ear device connects to the application via a wireless connection (e.g., BLE) between the ear device and a mobile device (e.g., smartphone 130) on which the application is running.

At block 1325, the sleep attributes logged by the ear device, for example, in the form of time-series data (e.g., time-series data 511) for one or more sleep sessions may be uploaded to the application. The logged data for the one or more sleep sessions may be stored by the application within an asynchronous storage database 1340 (which may be analogous to asynchronous storage database 380).

At block 1330, a sleep summary is displayed to the user via the application.

At block 1335, the user is prompted to complete a sleep questionnaire. The sleep questionnaire may prompt for information relating to how the user feels and various sleep influencers (e.g., time of last meal, whether the user consumed alcohol and/or caffeine, occurrences of night disturbances, recent exercise, etc.). Answers to the sleep questionnaire may also be stored to the asynchronous storage database 1340 and linked to the recently ended sleep session.

At decision block 1345, it is determined whether the user has a cloud account associated with the ear device. If so, processing continues with block 1350 where the sleep data from the asynchronous storage database 1340 is uploaded to the cloud account for accessibility via and by cloud services (e.g., cloud services 140 or 400). Otherwise, the user may be prompted to sign up for a cloud account.

At block 1355, databases (e.g., a relational database 1360, which may be analogous to relational database 440 and a time-series database 1365, which may be analogous to time-series database 450) are updated as appropriate to add the received sleep data for the user under the user's profile.

Example Functions Available at Anytime

Figure 14:
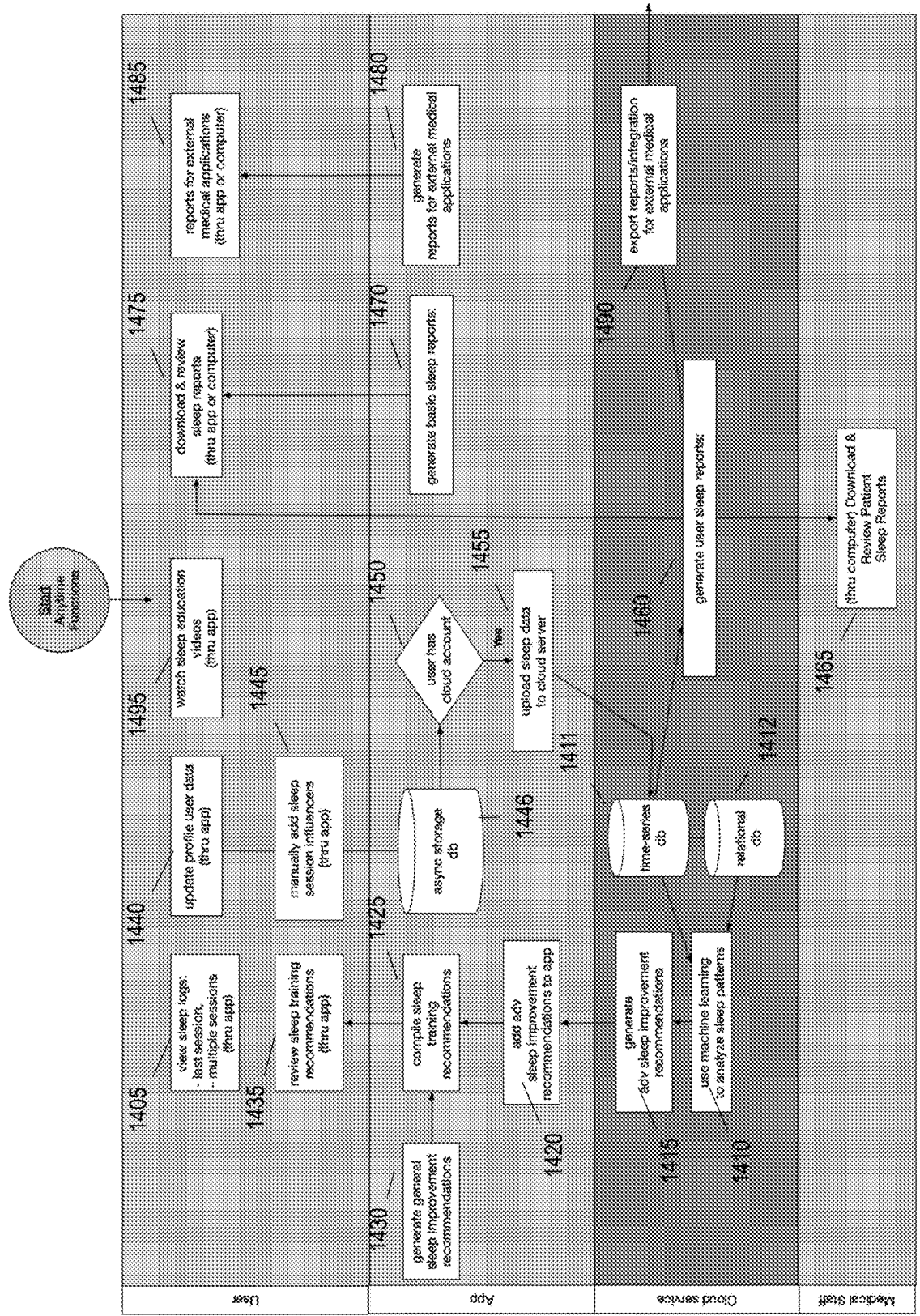
FIG. 14 is a flow diagram illustrating operations for accessing various functions outside of the context of a sleep session in accordance with an embodiment of the present disclosure.

FIG. 14 is a flow diagram illustrating operations for accessing various functions that may be available at any time in accordance with an embodiment of the present disclosure. In the context of FIG. 14, activities and/or processing performed by a user (e.g., user 101 or 1001), an application (e.g., app 131 or mobile app 310) associated with the ear device (e.g., ear device 110 or 200), cloud services (e.g., cloud services 140 or 400), and medical staff are shown in an upper portion, a middle portion, and a lower portion of the figure, respectively.

At block 1405, through the application, the user may view sleep logs (e.g., a sleep log for the last sleep session or sleep logs for multiple sessions).

At block 1410, ML techniques may be applied to analyze sleep patterns for the user based on sleep data retrieved from databases (e.g., a relational database 1412, which may be analogous to relational database 440 and/or 1360 and a time-series database 1411, which may be analogous to time-series database 450 and/or 1365). The data analyzed may include answers associated with sleep questionnaires, logged sleep attributes for a number of sleep sessions, device parameters established by the user, and/or past or current sleep profiles. In some embodiments, data from multiple users of a community of users of ear devices may be analyzed.

At block 1415, advanced sleep improvement recommendations (e.g., adjust one or more sleep profile attribute values, etc.) may be generated based on the ML analysis performed in block 1410.

At block 1420, the advanced sleep improvement recommendations generated in block 1415 are added to the application.

At block 1430, general sleep improvement recommendations may be generated by the application.

At block 1425, sleep training recommendations may be compiled for the user. The sleep training recommendations may represent a combination of the advanced sleep improvement recommendations and the general sleep improvement recommendations.

At block 1435, the user may review the sleep training recommendations through the application.

At block 1440, the user may update profile user data (e.g., name, demographic information, payment information, username and authentication credentials for a cloud account associated with the ear device, etc.), which may be updated within the asynchronous storage database 1446.

At block 1445, via the application, the user may manually add and/or update sleep session influencers (e.g., information regarding the user's last meal, consumption of alcohol and/or caffeine, occurrences of night disturbances, recent exercise, how the user feels, etc.) within a sleep questionnaire for a prior sleep session, which may be updated within the asynchronous storage database 1446.

At block 1495, the user may watch sleep education videos and/or access other sleep education materials and/or resources via the application.

At block 1460, the cloud services may generate user sleep reports on a periodic basis and/or on demand at the request of the user. The user sleep reports may provide information regarding single session sleep patterns throughout the night, including, for example, sleep positions, breathing rate, heart rate, blood oxygen levels) and/or information regarding sleep hygiene, SA indicators (e.g., observed incidents of breathing cessation, etc.), and/or snoring frequency severity.

At block 1465, authorized medical staff, provided with access to the user's cloud account by the user, may download and review patient-shared sleep reports generated in block 1460.

At block 1470, the application may generate basic sleep reports on a periodic basis and/or on demand at the request of the user. The basic sleep reports may provide information regarding single or multiple session sleep patterns throughout the night, including, for example, sleep positions, breathing rate, heart rate, blood oxygen levels).

At block 1475, the user may download and/or review the sleep reports generated in block 1460 and/or 1470 via a web browser or via the application, respectively.

At block 1480, the application may generate reports for external medical applications (e.g., an EMR solution) in an appropriate format (e.g., CVS, OSCAR, or the like).

At block 1490, the cloud services may export reports (e.g., suitable for integration with external medical applications).

At block 1485, the user may download and/or review the reports generated in block 1480 and/or 1490 via a web browser or via the application, respectively, which can be forwarded to medical staff through other apps (e.g. email, text messaging) and/or uploaded to other medical apps on the users smartphone.

While in the context of the flow diagrams (e.g., FIGS. 8, and 11-14) described and illustrated herein a number of enumerated blocks are included, it is to be understood that examples may include additional blocks before, after, and/or in between the enumerated blocks. Similarly, in some examples, one or more of the enumerated blocks may be omitted and/or performed in a different order.

Example Time-Series Data Structure

FIG. 15 is a table 1500 illustrating various types of data that may be stored in an in-memory time-series data structure in accordance with an embodiment of the present disclosure. Table 1500 represents a non-limiting example, of various types of data that may be logged and represented in the form of time-series data (e.g., time-series data 511) for a given monitoring interval during a sleep session as described above, for example, with reference to FIGS. 5, 11, and 12. As described further below with reference to FIG. 16, the monitoring interval may be a configurable parameter (e.g., a standby delay time) that represents the amount of time a state machine task (e.g., state machine task 532) delays between monitoring cycles.

Table 1500 includes a data type column 1510, a name column 1520, and a description column 1530. The data type column 1510 indicates the type of value (e.g., integer, unsigned integer, floating point, etc.) the named data item may have and potentially the number of bits (e.g., 8, 16, 32, etc.) that are used to represent the named data item. The description column 1530 provides a brief description of the corresponding data item, for example, including units or the basis for computing the value of the data item. It is to be appreciated some of the data items (e.g., hardware flags, software flags, voltage and amperage values, processor temperature, etc.) may be used for internal purposes, for example, by the manufacturer or vendor of the ear device.

In the present example, each entry of the time-series data includes: a 32-bit time stamp 1501 indicative of the time at which the associated data item values were captured; a state 1503 indicative of the current ear device state, for example, one of the ear device states described above with reference to FIG. 7; a state time 1503 indicative of how long the ear device (e.g., ear device 110 or 200) has been in the state; a current alert level 1504 indicative from which a volume and/or persistence of the alert required to cause the user (e.g., 101 or 1001) to change their sleeping position; an alert count 1505 indicative of the total number of alerts that have been triggered during the current sleep session; a motion count 1506 indicative of how many times motion has been detected by a positional sensor (e.g., positional sensor 220); a microphone count 1507 indicative of how many times sound has been detected by a microphone (e.g., microphone 215); X 1511 indicative of the X component of the current (last reported) absolute pointing vector of the ear device (as indicated by a positional sensor (e.g., positional sensor 220)); Y 1512 indicative of the Y component of the current (last reported) absolute pointing vector of the ear device; Z 1513 indicative of the Z component of the current (last reported) absolute pointing vector of the ear device; tare X 1514 indicative of the X component of the current calibrated alert vector of the alert zone (e.g., alert zone 1030); tare Y 1515 indicative of the Y component of the current calibrated alert vector; tare Z 1516 indicative of the Z component of the current calibrated alert vector, heart rate 1521 indicative of beats per minute, for example, extrapolated or determined based on movement or sound captured over a predetermined amount of time by the positional sensor or the microphone; breathing rate 1522 indicative of breaths per minute, for example, extrapolated or determined based on movement or sound captured over a predetermined amount of time by the positional sensor or the microphone; oxygen saturation 1523 indicative of the current oxygen saturation reading, for example, from an external oximeter (e.g., pulse oximeter 121); and computed angles (zAngle 1524, zPitch 1525, and zRoll 1526) computed from X, Y, Z and tare X, tare Y, tare Z, vectors as described below. While for purposes of illustration a concrete example of the time-series data structure has been shown and described with reference to FIG. 15, it is to be appreciated, more or fewer data items may be captured in the time-series data structure and different data types may be used.

Example Configuration Parameters Data Structure

FIG. 16 is a table illustrating various types of data that may be stored in an in-memory configuration parameters data structure in accordance with an embodiment of the present disclosure. Table 1600 represents a non-limiting example of various types of ear device configuration parameters that may be configured by the user (e.g., user 101 or 1001).

Table 1600 includes a data type column, a name column, and a description, a default value column, and a details column. The data type column indicates the type of value (e.g., integer, unsigned integer, floating point, etc.) the named parameter may have and potentially the number of bits (e.g., 8, 16, 32, etc.) that are used to represent the named parameter. The default value column identifies default values for respective named parameters. The description column provides a brief description of the corresponding parameter, for example, including units, a range of permissible values, data representation format, etc. It is to be appreciated some of the data items (e.g., version identifier (ID)) may be used by the manufacturer of vendor of the ear device (e.g., ear device 110 or 200), for example, for purposes of facilitating handling of changes to the configuration parameter data structure by software/firmware of the ear device.

In the present example, the configuration parameters include: a disable TSD flag 1601 indicative of whether or not time-series data (e.g., time-series data 511) is to be logged; an alert holdoff count 1602 indicative of a delay before issuing an alert to the user for the first time, for example, responsive to determining the user's sleep position is within the alert zone (e.g., alert zone 1030) or responsive to the detecting snoring by the user; an alert squelch level 1603 indicative of an alert level at which no further alerts are to be issued to the user; an alert mode 1604 indicative of whether an arithmetic progression or a geometric progression is to be used for determining the volume of alerts; an alert start value 1605 indicative of a starting volume on which subsequent alerts of an alert set may build; a time zone offset 1606 indicative of the offset of the user's local time zone from coordinated universal time (UTC); acceleration tare X 1607 indicative of the X component of the alert zone angle/vector set by the user during calibration; acceleration tare Y 1608 indicative of the Y component of the alert zone angle/vector; acceleration tare Z 1609 indicative of the Z component of the alert zone angle/vector; an alert scale factor 1610 representing the slope (m) of the arithmetic progression or the scale factor (m) of the geometric progression, as the case may be; an alert growth factor 1611 representing the growth rate (r) of the geometric progression; an alert angle 1612 indicative of the width of the alert zone and whether the alert zone is to be inverted; an alert snooze time 1613 indicative of the amount of time the ear device is to inhibit issuance of subsequent alerts responsive to receipt of a snooze command from a user before issuing subsequent alerts; an alert delay time 1614 indicative of the amount of time to pause between successive alerts of an alert set; a standby delay time 1615 indicative of the amount of time to delay between monitoring cycles performed by a state machine task (e.g., state machine task 532); an alert duration time 1616 indicative of the length of time to play an audible notification that is in the form of a tone; and an alert pattern 1617 indicative of whether a tone or a sampled sound (or collection of sampled sounds) is to be used as the alert and when a tone is to be used, the rhythm of the tone.

While for purposes of illustration a concrete example of a set of device configuration parameters has been shown and described with reference to FIG. 16, depending on the particular implementation, more or fewer parameters may be used and different data types may be used. While these parameters are generally not logged as part of the time-series data, some may be included within sleep reports and/or exports of logged data, for example, to provide context for a given report or export.

Example of Computing zAngle

Given that the dot product of two Euclidean vectors (gp and tp) is defined as the product of their magnitudes multiplied by the cosine of the angle between them, computing the zAngle can be done by computing the dot product of gp and tp, dividing by the product of their magnitudes, and taking the inverse cosine.

Assuming ONE_G is the magnitude of the positional sensor value when acceleration is equal to gravity (9.8 m/s/s), for purposes of completeness, below is a non-limiting example of how this might be done in code:

```
float tpx=(float) cfg.accelTareX/ONE_G;
float tpy=(float) cfg.accelTareY/ONE_G;
float tpz=(float) cfg.accelTareZ/ONE_G;
float tmag=sqrt(tpx*tpx+tpy*tpy+tpz*tpz);
float gpx=(float) tsd.X/ONE_G;
float gpy=(float) tsd.Y/ONE_G;
float gpz=(float) tsd.Z/ONE_G;
float gmag=sqrt(gpx*gpx+gpy*gpy+gpz*gpz);
// Compute the angle in degrees between the tare vector
    and the current vector
tsd.zAngle=acos((tpx*gpx+tpy*gpy+tpz*gpz)/
    (tmag*gmag))*4068/1;
```

Example of Establishing a Rotational Frame of Reference

Translation of the measured vector by the positional sensor into the relative frame of reference established by the tare vector can be done using by any number of mathematical techniques including, but not limited to, using a rotational matrix, or unit quaternions, or the Angle-Axis method. For purposes of completeness, below is a non-limiting example of how this might be done in code using a pre-computed rotational matrix:

```
// Rotate the current vector into the head reference frame
float ax = g_rMatrixA11 * gpx +g_rMatrixA21 * gpx + g_rMatrixA31 * gpx;
float ay = g_rMatrixA12 * gpy + g_rMatrixA22 * gpy+ g_rMatrixA32 * gpy;
float az = g_rMatrixA13 * gpz + g_rMatrixA23 * gpz+g_rMatrixA33 *gpz;
void computeRotationMatrix( ) {
    float Amag = sqrt(cfg.accelTareX * cfg.accelTareX + cfg.accelTareY *
    cfg.accelTareY + cfg.accelTareZ * cfg.accelTareZ);
    float Ax = cfg.accelTareX / Amag;
    float Ay = cfg.accelTareY / Amag;
    float Az = cfg.accelTareZ / Amag;
    g_rMatrixA11 = (Ay * Ay - Ax * Ax * Az) / (Ax * Ax + Ay * Ay);
    g_rMatrixA12 = (-Ax * Ay - Ax * Ay * Az) / (Ax * Ax + Ay *Ay);
    g_rMatrixA13 = Ax;
    g_rMatrixA21 = g_rMatrixA12;
    g_rMatrixA22 = (Ax * Ax - Ay * Ay * Az) / (Ax * Ax + Ay * Ay);
    g_rMatrixA23 = Ay;
    g_rMatrixA31 = -Ax;
    g_rMatrixA32 = -Ay;
    g_rMatrixA33 = -Az;
}
```

Example Determination of Breathing Rate and Breathing Interruptions

FIG. 17 depicts breathing captured via a positional sensor in the form of a first graph 1710 illustrating a zAngle computed at 200 Hertz (Hz) over the course of 20 seconds and a second graph 1720 illustrating the results after passing the zAngle data through an exponential moving average (EMA) low-pass filter in accordance with an embodiment of the present disclosure.

The gentle undulation of breathing can be seen in the raw waveform in the first graph 1710, which becomes further apparent after passing the data through the EMA low-pass filter. The EMA low-pass filter removes all of the high frequency noise. The regular ebb and flow of breathing can be clearly seen even if it is only a fraction of a degree.

According to one embodiment, EMA may be computed very efficiently using simple addition, subtraction and bit-shift, for example, in accordance with the following equation:

$$ema = (current\_zAngle >> 6) + (ema - (ema >> 6)) \quad \text{EQ \#1}$$

Figure 18:
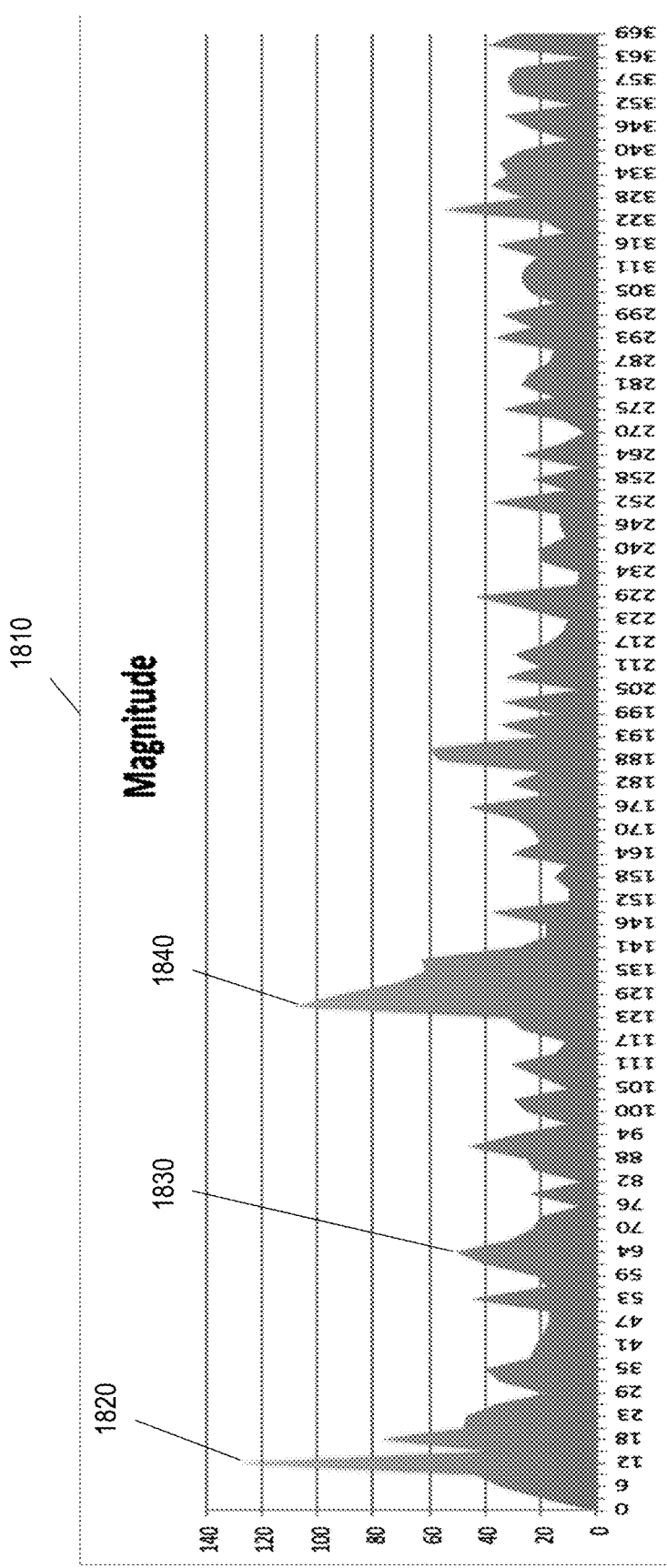
FIG. 18 is a graph illustrating the results of transforming the zAngle data of FIG. 17 into the frequency domain through a discrete Fast Fourier Transform (FFT) and discarding the zero order frequency in accordance with an embodiment of the present disclosure.

FIG. 18 is a graph 1810 illustrating the results of transforming the zAngle data of FIG. 17 into the frequency domain through a discrete Fast Fourier Transform (FFT) and discarding the zero order frequency (expressing DC offset or DC bias) in accordance with an embodiment of the present disclosure. In this example, the breathing rate is expressed as a peak magnitude in the first graph 1820 at 12 breaths per minute (BPM) in the frequency domain between 1 and 30 cycles per minute. According to one embodiment, breathing rate can be computed by using an FFT or by measuring the average peak-to-peak distance (wavelength) of the EMA and converting those measurements into the frequency of breaths per minute.

Figure 19:
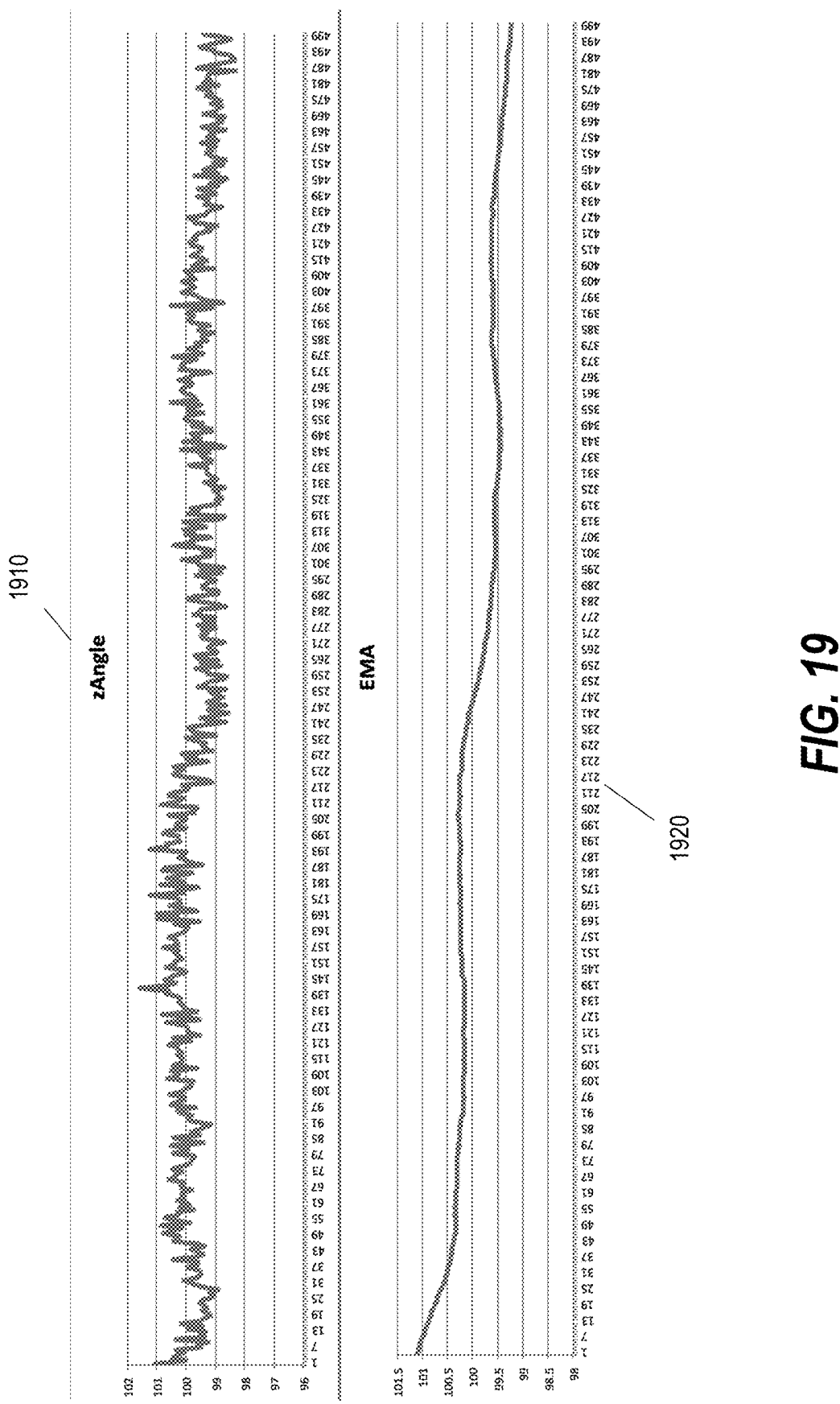
FIG. 19 depicts breathing captured via a positional sensor in the form of a first graph illustrating a zAngle computed at 25 Hz over the course of 20 seconds during which there is macro movement of the body of the user and a second graph illustrating the results after passing the zAngle data through an EMA low-pass filter in accordance in accordance with an embodiment of the present disclosure.

FIG. 19 depicts breathing captured via a positional sensor (e.g., positional sensor 220) in the form of a first graph 1910 illustrating a zAngle computed at 25 Hz over the course of 20 seconds during which there is macro movement of the body of the user (e.g., user 101 or 1001) and a second graph 1920 illustrating the results after passing the zAngle data through an EMA low-pass filter in accordance with an embodiment of the present disclosure.

As can be seen, with reference to graphs 1910 and 1920, the gentle undulation of breathing remains apparent even when there is macro movement of the body. This macro movement is expressed as a general trend, either rising or falling, of the data as a whole. However, this macro movement is completely filtered out when the data is transformed into the frequency domain through a discrete FFT and the zero order frequency (expressing DC offset) is discarded.

In one embodiment, breathing interruption (or an incident of breathing cessation) is characterized by consistent breathing followed by immediate absence of breathing without significant motion of the ear device (indicating the ear device has been removed from the ear), followed by consistent breathing again.

Figure 20:
FIG. 20 is a graph illustrating the results of transforming the zAngle data of FIG. 19 into the frequency domain through a discrete FFT and discarding the zero order frequency in accordance with an embodiment of the present disclosure.

FIG. 20 is a graph illustrating the results of transforming the zAngle data of FIG. 19 into the frequency domain through a discrete FFT and discarding the zero order frequency in accordance with an embodiment of the present disclosure. As above, the breathing rate is expressed as a peak magnitude (at 6 BPM) in the frequency domain between 1 and 30 cycles per minute. Breathing rate can be computed by using an FFT or by measuring the average peak-to-peak distance (wavelength) of the EMA and converting those measurements into the frequency of breaths per minute. Alternatively, breathing rate can be determined using a microphone as described below with reference to FIG. 21.

Figure 21:
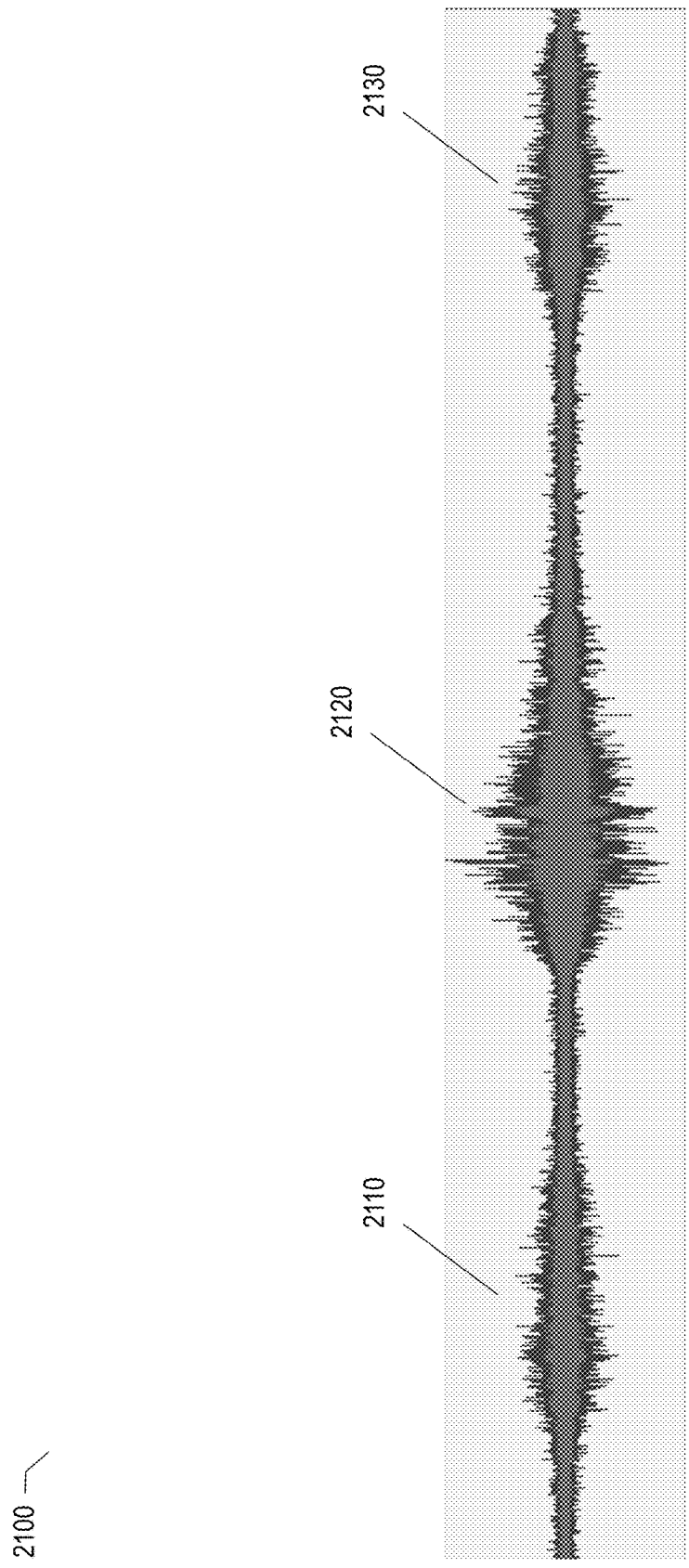
FIG. 21 depicts breathing captured using a microphone in accordance with an embodiment of the present disclosure.

FIG. 21 depicts a waveform 2100 representing breathing captured using a microphone (e.g., microphone 215) in accordance with an embodiment of the present disclosure. In one embodiment, sampled audio from the microphone is amplified. At this point, a noise reduction filter may be optionally applied. Although not required, a combination of a low-pass filter with 48 dB rolloff at 1000 Hz and a high-pass filter with 6 dB rolloff at 700 Hz can be applied to better isolate the breathing sound. Specific parameters for these filters can be adjusted as necessary to provide the best performance in regards to isolating the breathing. An alternating pattern of inhaling 2110 and 2130 and exhaling 2130 is revealed in the resulting waveform 2100. Measuring the root mean square (RMS) amplitude of this waveform 2100 and further passing that RMS through an EMA low-pass filter or decimation filter will result in a steady undulating waveform at 2× the breathing rate.

According to one embodiment, breathing rate can be computed by using an FFT or by measuring the average peak-to-peak distance (wavelength) of the EMA derived from the RMS amplitude and converting those measurements into the frequency of breaths per minute.

As those skilled in the art will appreciate, a user's heart rate may be determined with the use of heartbeats captured via a positional sensor (e.g., positional sensor 220) or heart sounds captured using a microphone (e.g., microphone 215) in a manner similar to that described above for breathing rate. According to one embodiment, heart rate can be computed by looking at the minor variations in the positional sensor. These variations appear as a pair of correlated high peaks at a frequency doubling. For example, in FIG. 18, there is a high magnitude peak 1840 at 129 beats per minute and a correlated peak 1830 at half of that frequency 64 beats per minute. In this case, the measured heart rate was between 63-65 bpm during this 20 second window.

Example of the Ear Device Positioned within a User's Ear

Figure 22:
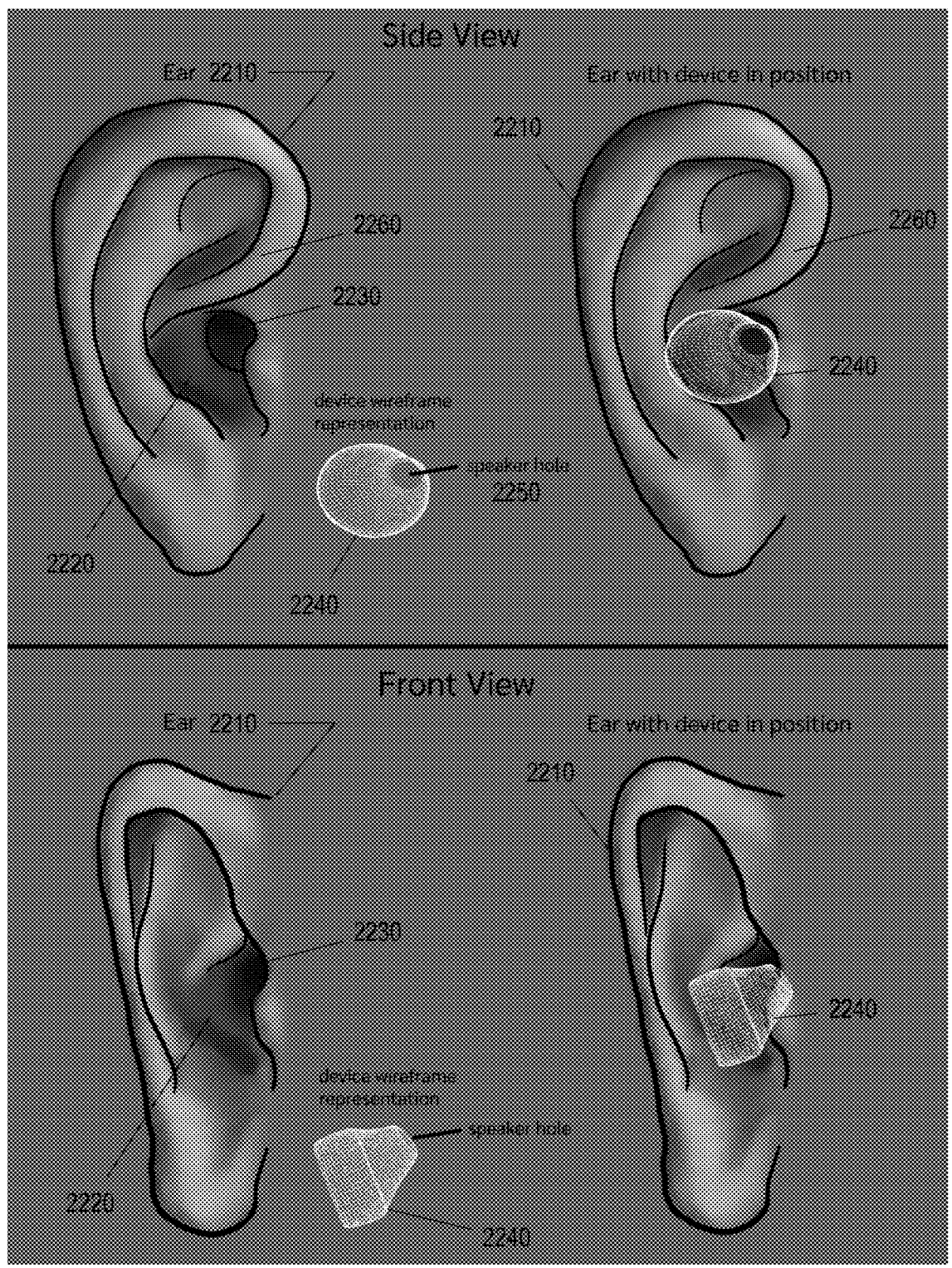
FIG. 22 depicts a side view and a front view of an ear of a user of an ear device illustrating how the ear device may sit within the concha of the ear in accordance with an embodiment of the present disclosure.

FIG. 22 depicts a side view and a front view of an ear 2210 of a user (e.g., user 101 or 1001) of an ear device 2240 illustrating how the ear device may sit within the concha 2220 of the ear in accordance with an embodiment of the present disclosure. In the context of the present example, the ear device 2240 (which may be analogous to ear device 110 or 200) is depicted in a wireframe representation showing a speaker hole 2250 at one end. In one embodiment, the speaker hole 2250 is an aperture in the housing of the ear device through which audible notifications created by a speaker (e.g., speaker 275) are directed out of the ear device and is located proximate to or within an auditory canal 230 of the user's ear when properly worn by the user.

While in the context of the present example, the ear device 2240 appears outwardly similar to a wireless earbud headphone, the wireframe representation of FIG. 22 is not intended to be limiting. In some embodiments, the ear device 2240 has a low profile design to allow it to sit comfortably within the concha 2220 without creating discomfort during a sleep session should the user sleep on that side. For the purpose better adhesion of the ear device 2240 to the ear 2210 through the sleep session, the ear device 2240 may include an integrated appendage or extension that engages with a helical crus 2260 and/or the antihelix. Alternatively, the appendage or extension may represent an accessory that may be attached or clipped on to the housing of the ear device 2240. Another option for maintaining the ear device 2240 within the user's ear 2210 is the inclusion of integrated or detachable over-ear ear hook.

Examples of Data that may be Captured to Facilitate Diagnosis

FIG. 23 is a table 2300 illustrating various types of sleep respiratory issues (e.g., conditions 2310), corresponding definitions 2320, and data captured 2330 for ear device reporting and facilitation of diagnosis of a given sleep respiratory issue by a medical professional in accordance with an embodiment of the present disclosure.

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices, for example, an ear device (e.g., ear device 110 or 200) or a mobile device (e.g., smartphone 130) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. A system for practicing various embodiments of the present disclosure may involve one or more computing systems (e.g., an ear device, a mobile device, and/or a cloud platform) (or one or more processing resources within a single computing system) and storage systems containing or having network access to computer program(s) coded in accordance with various methods described herein, and the method steps associated with embodiments of the present disclosure may be accomplished by modules, routines, subroutines, or subparts of a computer program product.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes a method comprising: establishing a positional sleep therapy alert range with reference to a positional sensor of one or more sensors associated with an ear device worn by a user, wherein the ear device is operable in one or more modes; and during a sleep session and operation of the ear device in a first mode of the one or more modes: determining whether a sleep position of the user is within the positional sleep therapy alert range based on a state of the positional sensor; and responsive to said determining being affirmative, prompting the user to alter their sleep position by providing an audible notification to the user via a speaker of the ear device that is proximate to or within an auditory canal of an ear of the user.

Example 2 includes the subject matter of Example 1, wherein the ear device is operating in a second mode of the one or more modes and wherein the method further comprises during an initial sleep session: disabling said prompting; and logging a plurality of observations regarding a current sleep position of the user, whether the current sleep position is within or outside of the positional sleep therapy alert range, and one or more of a breathing rate of the user, a heart rate of the user, a snoring state of the user, existence or non-existence of a breathing interruption, and an oxygen saturation of blood of the user by performing repeated measurements over time of the positional sensor and one or more other sensors associated with the ear device.

Example 3 includes the subject matter of Example 1 or 2, wherein said determining involves one or more of: periodically monitoring the state of the positional sensor and reading the state of the positional sensor responsive to detecting movement of the user.

Example 4 includes the subject matter of any of Examples 1-3, further comprising repeating said prompting in accordance with an alert profile.

Example 5 includes the subject matter of Example 4, wherein the alert profile specifies one or more of: a volume of the audible notification, a rate of repetition of the audible notification with a set time duration in between, a time delay of a start of the audible notification, a dynamically calculated and manually set number of repetitions of the audible notification, a pattern of the audible notification, a duration of the audible notification, and a type of sound associated with the audible notification.

Example 6 includes the subject matter of Example 4, further comprising: evaluating whether a subsequent sleep position of the user is within the positional sleep therapy alert range; and responsive to said evaluating being negative, discontinuing said repeating.

Example 7 includes the subject matter of any of Examples 1-6, wherein said establishing includes: responsive to input by the user, calibrating a pointing vector of the positional sensor for use during the sleep session as a relative frame of reference for subsequent determination of an orientation of a head of the user in three-dimensional (3D) space; and calculating the positional sleep therapy alert range based on the calibrated pointing vector and an offset vector.

Example 8 includes the subject matter of Example 7, wherein the offset vector is configurable by the user via a mobile application associated with the ear device.

Example 9 includes the subject matter of Example 7, wherein the state of the positional sensor comprises a current pointing vector of the positional sensor and wherein said determining includes: determining the current pointing vector; and determining whether the current pointing vector is in a favorable or unfavorable orientation with respect to the calibrated pointing vector based on the positional sleep therapy alert range.

Example 10 includes the subject matter of any of Examples 1-9, further comprising: transmitting the state of the positional sensor from the ear device to a smartphone or external processing device in communication with the ear device via wireless communication; and performing said determining whether a sleep position of the user is within the positional sleep therapy alert range by a mobile application running on the smartphone or the external processing device.

Example 11 includes the subject matter of any of Examples 1-10, wherein the positional sensor comprises an accelerometer.

Example 12 includes the subject matter of any of Examples 1-10, wherein the positional sensor comprises a gyroscope.

Example 13 includes the subject matter of any of Examples 1-10, wherein the positional sensor comprises an inertial measurement unit.

Example 14 includes the subject matter of any of Examples 1-10, wherein the positional sensor comprises a magnetometer.

Example 15 includes the subject matter of any of Examples 1-14, wherein the positional sleep therapy alert range represents one or more undesired orientations of a head of the user in three-dimensional (3D) space.

Example 16 includes the subject matter of any of Examples 1-14, wherein the positional sleep therapy alert range represents one or more desired orientations of a head of the user in three-dimensional (3D) space.

Example 17 includes the subject matter of any of Examples 1-16, further comprising measuring a breathing rate of the user based on positional data received from the positional sensor or based on breath sounds detected by a microphone of the ear device.

Example 18 includes the subject matter of any of Examples 1-17, further comprising measuring a heart rate of the user based on one or more of: positional data received from the positional sensor, an electrocardiogram, a pulse oximeter, and on heart sounds detected by a microphone of the ear device.

Example 19 includes the subject matter of any of Examples 1-18, further comprising identifying a breathing interruption experienced by the user based on one or more of positional data received from the positional sensor and an absence of breath sounds detected by a microphone of the ear device.

Example 20 includes the subject matter of any of Examples 1-19, further comprising logging time-series data during the sleep session, wherein a given record of the time-series data for a particular time interval includes a timestamp and one or more of: information regarding a sleep position determined during the particular time interval; a breathing rate of the user; an indication of whether a breathing interruption was detected during the particular time interval; an indication of whether snoring by the user was detected during the particular time interval; and an indication of whether the sleep position determined during the particular time interval was within or outside of the positional sleep therapy alert range.

Example 21 includes the subject matter of Example 20, further comprising exporting a report or raw data in a data interchange format or a medical format based on the time-series data.

Example 22 includes the subject matter of Example 20, further comprising presenting to the user via a mobile application associated with the ear device a summary of the sleep session based on the time-series data.

Example 23 includes the subject matter of Example 20, further comprising: during the sleep session, determining whether the user is snoring based on sound received via a microphone of the ear device or via vibration detected by the positional sensor; and responsive to an affirmative determination that the user is snoring, prompting the user to alter their sleep position by providing the audible notification to the user via the speaker.

Example 24 includes the subject matter of Example 20, further comprising based on the time-series data, notifying the user to consult with a medical professional regarding potential existence of a sleep respiratory issue.

Example 25 includes the subject matter of any of Examples 1-24, further comprising after completion of the sleep session, prompting the user via a mobile application associated with the ear device to complete a sleep session questionnaire that captures information regarding how the user feels and information regarding external influencers on sleep quality and duration.

Some embodiments pertain to Example 26 that includes an ear device comprising: a positional sensor including one or more of an accelerometer, a gyroscope, an inertial measurement unit, and a magnetometer; a speaker that is positioned proximate to or within an auditory canal of an ear of a user when worn by the user; a processor; and instructions that when executed by the processor cause the ear device to: establish a positional sleep therapy alert zone with reference to the positional sensor; during a sleep session, determine whether a sleep position of the user is within the positional sleep therapy alert zone based on a state of the positional sensor; and responsive to an affirmative determination, provide an alert to the user in a form of an audible notification via the speaker.

Example 27 includes the subject matter of Example 26, wherein the sleep position is determined by one or more of: periodically monitoring the state of the positional sensor and reading the state of the positional sensor responsive to detecting movement of the user.

Example 28 includes the subject matter of Example 27, wherein the instructions further cause the ear device to repeat the alert in accordance with an alert profile.

Example 29 includes the subject matter of Example 28, wherein the alert profile specifies one or more of: a volume of the audible notification, a rate of repetition of the audible notification with a set time duration in between, a time delay of a start of the audible notification, a dynamically calculated and manually set number of repetitions of the audible notification, a pattern of the audible notification, a duration of the audible notification, and a type of sound associated with the audible notification.

Example 30 includes the subject matter of any of Examples 26-29, wherein the instructions further cause the ear device to: evaluate whether a subsequent sleep position of the user is within the positional sleep therapy alert zone; and responsive to a negative evaluation, discontinue repetition of the alert.

Example 31 includes the subject matter of any of Examples 26-30, wherein the instructions further cause the ear device to measure and log a breathing rate of the user based on positional data received from the positional sensor or based on breath sounds detected via a microphone of the ear device.

Example 32 includes the subject matter of any of Examples 26-31, wherein the instructions further cause the ear device to measure and log a heart rate of the user based on one or more of: positional data received from the positional sensor, an electrocardiogram, a pulse oximeter, and on heart sounds detected by a microphone of the ear device.

Example 33 includes the subject matter of any of Examples 26-32, wherein the instructions further cause the ear device to identify a breathing interruption experienced by the user based on one or more of positional data received from the positional sensor and an absence of breath sounds detected via a microphone of the ear device.

Example 34 includes the subject matter of any of Examples 26-33, wherein the instructions further cause the ear device to log time-series data during the sleep session, wherein a given record of the time-series data for a particular time interval includes a timestamp and one or more of: information regarding a sleep position determined during the particular time interval; a breathing rate of the user; an indication of whether a breathing interruption was detected during the particular time interval; an indication of whether snoring by the user was detected during the particular time interval; and an indication of whether the sleep position determined during the particular time interval was within or outside of the positional sleep therapy alert zone.

Example 35 includes the subject matter of Example 34, further comprising a wireless transmitter and wherein the instructions further cause the ear device to: deactivate the wireless transmitter prior to the sleep session; and after completion of the sleep session as indicated by docking of the ear device with a charging station: activate the wireless transmitter; and transmit the time-series data via the wireless transmitter to a mobile application associated with the ear device.

Example 36 includes the subject matter of any of Examples 26-35, wherein an enclosure of the ear device has a low profile design that allows the ear device to sit in the concha or auditory canal of the ear.

Example 37 includes the subject matter of any of Examples 26-36, wherein an enclosure of the ear device supports attachment of an accessory to facilitate engagement with the helical crus of the ear.

Example 38 includes the subject matter of any of Examples 26-37, further comprising a microphone and wherein the instructions further cause the ear device to: during the sleep session, determine whether the user is snoring based on sound received via the microphone or vibrations detected by the positional sensor; and responsive to an affirmative determination that the user is snoring, provide the alert to the user via the speaker.

Some embodiments pertain to Example 39 that includes a method comprising: logging a plurality of observations regarding existence or non-existence of an incident of breathing cessation and one or more of: an orientation of a head of a user of an ear device in three-dimensional (3D) space, a breathing rate of the user, a heart rate of the user, a snoring state of the user, and an oxygen saturation of blood of the user by performing repeated measurements over time of a plurality of sensors associated with the ear device worn by the user during a sleep session; and identifying the user as potentially having a sleep respiratory issue by evaluating the plurality of observations.

Example 40 includes the subject matter of Example 39, wherein the plurality of sensors include a positional sensor including one or more of an accelerometer, a gyroscope, an inertial measurement unit, and a magnetometer and wherein the method further comprises determining the orientation of the head of the user based on a state of the positional sensor.

Example 41 includes the subject matter of Example 39 or 40, further comprising notifying the user to consult with a medical professional regarding potential existence of the sleep respiratory issue.

Example 42 includes the subject matter of Examples 40 or 41, further comprising measuring and logging the breathing rate based on positional data received from the positional sensor or based on breath sounds received by a microphone of the ear device.

Example 43 includes the subject matter of any of Examples 40-42, further comprising measuring and logging the heart rate based on one or more of: positional data received from the positional sensor, an electrocardiogram, a pulse oximeter, and on heart sounds detected by a microphone of the ear device.

Example 44 includes the subject matter of any of Examples 39-43, further comprising measuring and logging the oxygen saturation via a portion of an ear of the user in which the ear device resides by an oximeter of the plurality of sensors that is coupled to the ear device.

Example 45 includes the subject matter of any of Examples 39-44, further comprising facilitating diagnosis of the sleep respiratory issue by a medical professional by exporting a report or raw data based on the logging in a data interchange format or a medical format.

Some embodiments pertain to Example 46 that includes an apparatus or system that implements or performs a method of any of Examples 1-25.

Example 47 includes at least one machine-readable medium comprising a plurality of instructions, when executed on a computing device, implement or perform a method or realize an apparatus as described in any preceding Example.

Example 48 includes an apparatus comprising means for performing a method as claimed in any of Examples 1-25.

Some embodiments pertain to Example 49 that includes an apparatus or system that implements or performs a method of any of Examples 39-45.

Example 50 includes at least one machine-readable medium comprising a plurality of instructions, when executed on a computing device, implement or perform a method or realize an apparatus as described in any preceding Example.

Example 51 includes an apparatus comprising means for performing a method as claimed in any of Examples 39-45.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A method comprising:
    establishing a positional sleep therapy alert range defining a three-dimensional (3D) shape within 3D space with reference to a pointing vector of a positional sensor of one or more sensors integrated with an ear device worn by a user, wherein, by virtue of a position of the ear device maintained within an ear of the user during a sleep session, the pointing vector represents a baseline frame of reference for determining a head orientation of the user in the 3D space during the sleep session and wherein the ear device is operable in one or more modes; and
    during the sleep session and operation of the ear device in a first mode of the one or more modes:
        determining whether a sleep position of the user, as indicated by a current head orientation of the user, is within the positional sleep therapy alert range based on a state of the positional sensor; and
        after said determining being affirmative, prompting the user to alter their sleep position by providing an audible notification to the user via a speaker of the ear device that is proximate to or within an auditory canal of an ear of the user.

2. The method of claim 1, wherein the ear device is operating in a second mode of the one or more modes and wherein the method further comprises during an initial sleep session:
    disabling said prompting; and
    logging a plurality of observations regarding a current sleep position of the user, whether the current sleep position is within or outside of the positional sleep therapy alert range, and one or more of a breathing rate of the user, a heart rate of the user, a snoring state of the user, existence or non-existence of a breathing interruption, and an oxygen saturation of blood of the user by performing repeated measurements over time of the positional sensor and one or more other sensors associated with the ear device.

3. The method of claim 2, wherein the first mode represents a therapeutic or notification mode and the second mode represents a diagnostic or logging mode.

4. The method of claim 1, wherein said determining involves reading the state of the positional sensor responsive to detecting movement of the user.

5. The method of claim 4, further comprising repeating said prompting in accordance with an alert profile.

6. The method of claim 5, wherein the alert profile comprises a user-configurable alert profile and specifies one or more of: a volume of the audible notification, a rate of repetition of the audible notification with a set time duration in between, a time delay of a start of the audible notification, a dynamically calculated and manually set number of repetitions of the audible notification, a pattern of the audible notification, a duration of the audible notification, and a type of sound associated with the audible notification.

7. The method of claim 6, further comprising analyzing time-series data collected for the sleep session and based thereon make a recommendation to the user to adjust one or more of the positional sleep therapy alert range, the volume of the audible notification, the rate of repetition of the audible notification, the number of repetitions of the audible notification, the duration of the audible notification, and the type of sound associated with the audible notification.

8. The method of claim 5, further comprising:
    evaluating whether a subsequent sleep position of the user is within the positional sleep therapy alert range; and
    responsive to said evaluating being negative, discontinuing said repeating.

9. The method of claim 1, wherein said establishing includes:
    responsive to input by the user, calibrating the pointing vector of the positional sensor for use during the sleep session as the baseline frame of reference for subsequent determination of the head orientation of a head of the user in the 3D space; and
    calculating the positional sleep therapy alert range based on the calibrated pointing vector and an offset vector.

10. The method of claim 9, wherein the offset vector is configurable by the user via a mobile application associated with the ear device.

11. The method of claim 9, wherein the state of the positional sensor comprises a current pointing vector of the positional sensor and wherein said determining includes:
    determining the current pointing vector; and
    determining whether the current pointing vector is in a favorable or unfavorable orientation with respect to the calibrated pointing vector based on the positional sleep therapy alert range.

12. The method of claim 1, further comprising:
    transmitting the state of the positional sensor from the ear device to a smartphone or external processing device in communication with the ear device via wireless communication; and
    performing said determining whether a sleep position of the user is within the positional sleep therapy alert range by a mobile application running on the smartphone or the external processing device.

13. The method of claim 1, wherein the positional sensor comprises an accelerometer.

14. The method of claim 1, wherein the positional sensor comprises a gyroscope.

15. The method of claim 1, wherein the positional sensor comprises an inertial measurement unit.

16. The method of claim 1, wherein the positional sensor comprises a magnetometer.

17. The method of claim 1, wherein the positional sleep therapy alert range represents one or more undesired orientations of a head of the user in three-dimensional (3D) space.

18. The method of claim 1, wherein the positional sleep therapy alert range represents one or more desired orientations of a head of the user in the 3D space.

19. The method of claim 1, further comprising measuring a breathing rate of the user based on positional data received from the positional sensor.

20. The method of claim 1, further comprising measuring a heart rate of the user based on positional data received from the positional sensor.

21. The method of claim 1, further comprising identifying a breathing interruption experienced by the user based on positional data received from the positional sensor.

22. The method of claim 1, further comprising logging time-series data during the sleep session, wherein a given record of the time-series data for a particular time interval includes a timestamp and one or more of:
   information regarding a sleep position determined during the particular time interval;
   a breathing rate of the user;
   an indication of whether a breathing interruption was detected during the particular time interval;
   an indication of whether snoring by the user was detected during the particular time interval; and
   an indication of whether the sleep position determined during the particular time interval was within or outside of the positional sleep therapy alert range.

23. The method of claim 22, further comprising exporting a report or raw data in a data interchange format or a medical format based on the time-series data.

24. The method of claim 22, further comprising presenting to the user via a mobile application associated with the ear device a summary of the sleep session based on the time-series data.

25. The method of claim 22, further comprising:
   during the sleep session, determining whether the user is snoring based on vibration detected by the positional sensor; and
   after an affirmative determination that the user is snoring, prompting the user to alter their sleep position by providing the audible notification to the user via the speaker.

26. The method of claim 22, further comprising based on the time-series data, notifying the user to consult with a medical professional regarding potential existence of a sleep respiratory issue.

27. The method of claim 22, further comprising after completion of the sleep session, prompting the user via a mobile application associated with the ear device to complete a sleep session questionnaire that captures information regarding how the user feels and information regarding external influencers on sleep quality and duration.

28. The method of claim 1, wherein the audible notification proactively mitigates occurrences of sleep respiratory issues by the user.

29. The method of claim 1, wherein positional sleep therapy alert range is user-specific.

30. The method of claim 1, wherein the audible notification comprises a sub-arousal audible notification performed during stage N1 or N2 of sleep.

31. An ear device comprising:
   a positional sensor including one or more of an accelerometer, a gyroscope, an inertial measurement unit, and a magnetometer;
   a speaker that is positioned proximate to or within an auditory canal of an ear of a user when worn by the user;
   a processor; and
   instructions that when executed by the processor cause the ear device to:
   establish a positional sleep therapy alert zone defining a three-dimensional (3D) shape within 3D space with reference to a pointing vector of the positional sensor, wherein, by virtue of a position of the ear device maintained within the ear of the user during a sleep session, the pointing vector represents a baseline frame of reference for determining a head orientation of the user in the 3D space during the sleep session and;
   during the sleep session, determine whether a sleep position of the user, as indicated by a current head orientation of the user, is within the positional sleep therapy alert zone based on a state of the positional sensor; and
   after an affirmative determination, provide an alert to the user in a form of an audible notification via the speaker.

32. The ear device of claim 31, wherein the sleep position is determined by reading the state of the positional sensor responsive to detecting movement of the user.

33. The ear device of claim 32, wherein the instructions further cause the ear device to repeat the alert in accordance with an alert profile.

34. The ear device of claim 33, wherein the alert profile comprises a user-configurable alert profile and specifies one or more of: a volume of the audible notification, a rate of repetition of the audible notification with a set time duration in between, a time delay of a start of the audible notification, a dynamically calculated and manually set number of repetitions of the audible notification, a pattern of the audible notification, a duration of the audible notification, and a type of sound associated with the audible notification.

35. The ear device of claim 34, wherein the instructions further cause the ear device to:
   evaluate whether a subsequent sleep position of the user is within the positional sleep therapy alert zone; and
   responsive to a negative evaluation, discontinue repetition of the alert.

36. The ear device of claim 31, wherein the instructions further cause the ear device to measure and log a breathing rate of the user based on positional data received from the positional sensor.

37. The ear device of claim 31, wherein the instructions further cause the ear device to measure and log a heart rate of the user based on positional data received from the positional sensor.

38. The ear device of claim 31, wherein the instructions further cause the ear device to identify a breathing interruption experienced by the user based on of positional data received from the positional sensor.

39. The ear device of claim 31, wherein the instructions further cause the ear device to log time-series data during the sleep session, wherein a given record of the time-series data for a particular time interval includes a timestamp and one or more of:
   information regarding a sleep position determined during the particular time interval;
   a breathing rate of the user;
   an indication of whether a breathing interruption was detected during the particular time interval;
   an indication of whether snoring by the user was detected during the particular time interval; and
   an indication of whether the sleep position determined during the particular time interval was within or outside of the positional sleep therapy alert zone.

40. The ear device of claim 39, further comprising a wireless transmitter and wherein the instructions further cause the ear device to:
   deactivate the wireless transmitter prior to the sleep session; and after completion of the sleep session as indicated by docking of the ear device with a charging station:
  activate the wireless transmitter; and
  transmit the time-series data via the wireless transmitter to a mobile application associated with the ear device.

41. The ear device of claim 31, wherein an enclosure of the ear device has a low profile design that allows the ear device to sit in the concha or auditory canal of the ear.

42. The ear device of claim 31, wherein an enclosure of the ear device supports attachment of an accessory to facilitate engagement with the helical crus of the ear.

43. The ear device of claim 31, further comprising a microphone and wherein the instructions further cause the ear device to:
  during the sleep session, determine whether the user is snoring based on vibrations detected by the positional sensor; and
  after an affirmative determination that the user is snoring, provide the alert to the user via the speaker.

* * * * *